United States Patent [19]

Wachi

[11] Patent Number: 5,537,374
[45] Date of Patent: Jul. 16, 1996

[54] OPTICAL RECORDING MEDIUM AND RECORDING AND/OR REPRODUCING APPARATUS USING SUCH OPTICAL RECORDING MEDIUM

[75] Inventor: Shigeaki Wachi, Kanagawa, Japan

[73] Assignee: Sony Corporation, Tokyo, Japan

[21] Appl. No.: 416,070

[22] Filed: Apr. 4, 1995

Related U.S. Application Data

[62] Division of Ser. No. 189,543, Jan. 26, 1994, Pat. No. 5,504,727.

[30] Foreign Application Priority Data

Jan. 29, 1993 [JP] Japan .................................. 5-034461
Jun. 30, 1993 [JP] Japan .................................. 5-186699

[51] Int. Cl.⁶ ............................................................ G11B 7/00
[52] U.S. Cl. ........................................ 369/44.340; 369/124
[58] Field of Search ............................ 369/44.11, 44.34, 369/44.41, 44.42, 124, 111, 44.32, 112

[56] References Cited

U.S. PATENT DOCUMENTS

| | | | |
|---|---|---|---|
| 4,663,751 | 5/1987 | Kaku et al. ............................. | 369/111 |
| 4,751,695 | 6/1988 | Kaku et al. ............................. | 369/44.41 |
| 4,849,953 | 7/1989 | Nomura et al. ......................... | 369/46 |
| 4,855,983 | 8/1989 | Arai ......................................... | 369/44.34 |
| 4,858,221 | 8/1989 | Romeas .................................. | 369/275.2 |
| 4,866,688 | 9/1989 | Ohtake et al. .......................... | 369/44 |
| 5,253,238 | 10/1993 | Shimonou ............................. | 369/44.25 |
| 5,268,887 | 12/1993 | Honguh et al. ....................... | 369/44.13 |
| 5,270,998 | 12/1993 | Uchiumi ................................. | 369/277 |
| 5,383,169 | 1/1995 | Shinoda et al. ....................... | 369/44.13 |

*Primary Examiner*—Nabil Z. Hindi
*Attorney, Agent, or Firm*—Limbach & Limbach

[57] ABSTRACT

An optical recording medium on which a data signal is formed comprises an area A of recording tracks for recording a data signal between pairs of grooves Gr and a d.c. offset cancel area B for canceling d.c. offset by the push-pull system, which serves as a predetermined area. In the d.c. offset cancel area B, no grove Gr is formed, and grooves are formed at the recording track center positions Tc. The groove at the recording track center position Tc is caused to have the same width and depth as those of the groove Gr. In carrying out recording/reproduction of a data signal by using this optical recording medium, a return light from the optical recording medium is detected by a bisected detector. A difference signal between outputs from the detector is determined by an amplifier. In accordance with an output signal of a sample-hold signal supply unit, first and second sample-hold units respectively hold signals having output phases different from each other by 180 degrees. An adder adds these signals to take out only a d.c. fluctuation component to eliminate the d.c. fluctuation component superimposed on a tracking error signal at a d.c. offset eliminating unit.

2 Claims, 16 Drawing Sheets

FIG.12a OPTICAL DISC

FIG.12b SUM SIGNAL OF OUTPUT SIGNALS OF BISECTED PHOTO DETECTOR

FIG.12c DIFFERENCE SIGNAL BETWEEN OUTPUT SIGNALS OF BISECTED PHOTO DETECTOR POSITIVE POSITION MOVEMENT

FIG.12d DIFFERENCE SIGNAL OF NEGATIVE POSITION MOVEMENT

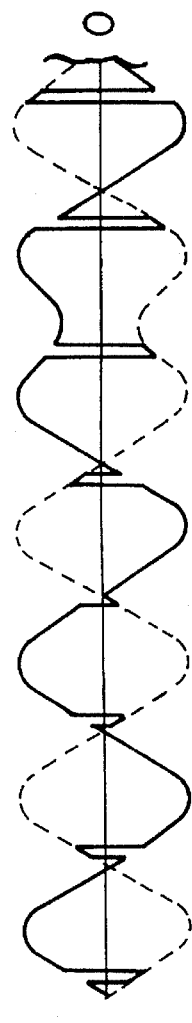
FIG. 14 ENVELOPE WAVEFORM OF PUSH-PULL SIGNAL WITHOUT OFFSET
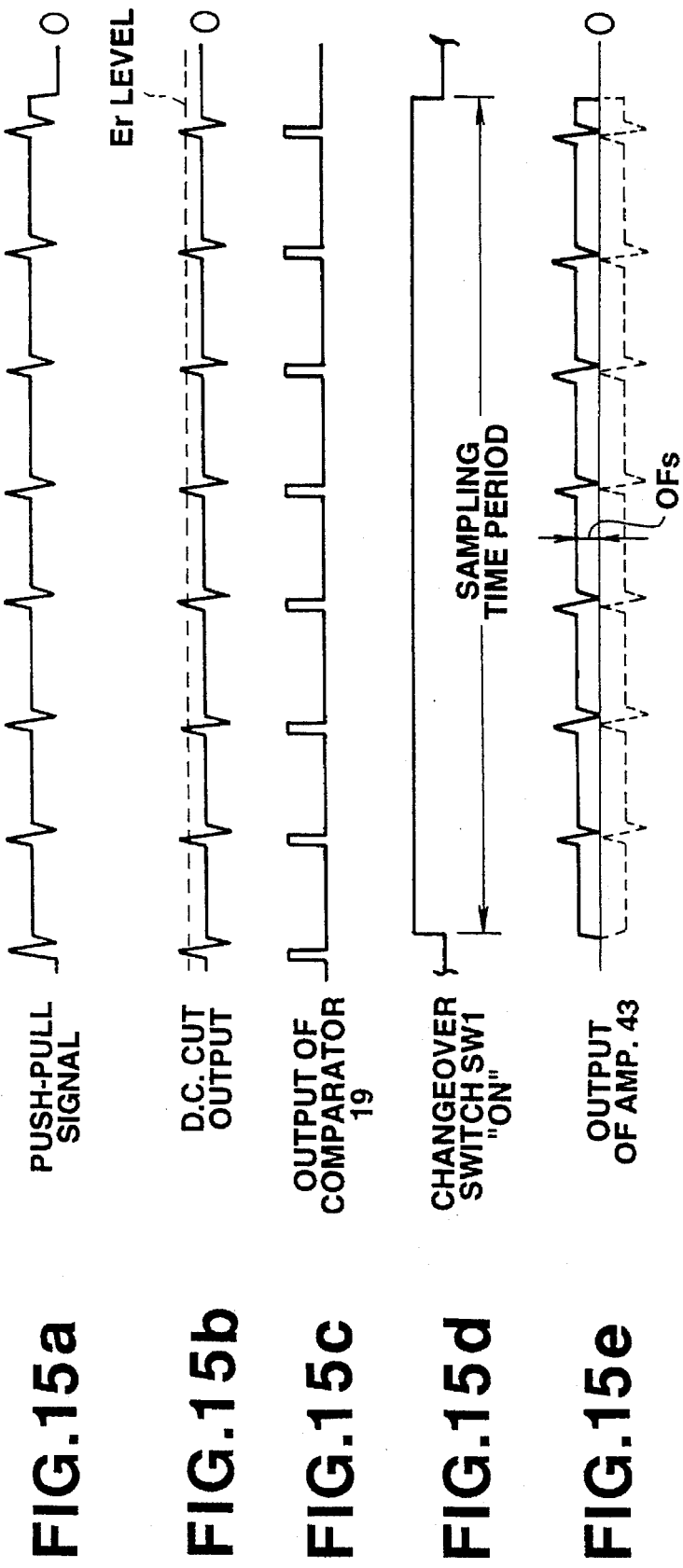
FIG.15a PUSH-PULL SIGNAL
FIG.15b D.C. CUT OUTPUT
FIG.15c OUTPUT OF COMPARATOR 19
FIG.15d CHANGEOVER SWITCH SW1 "ON"
FIG.15e OUTPUT OF AMP. 43

FIG.16a ACTUAL SAMPLING WAVEFORM (EXTRACTION OF D.C. OFFSET)
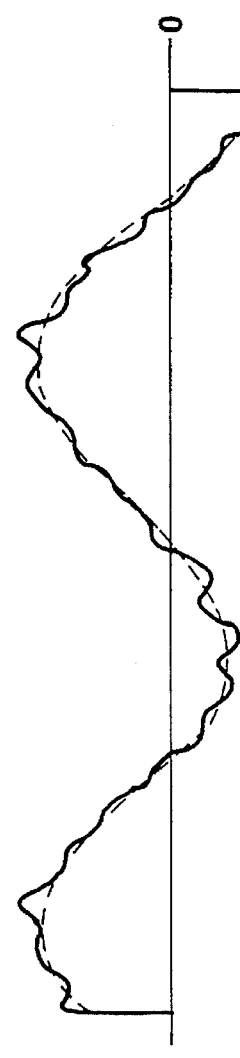
FIG.16b ACTUAL OUTPUT OF HOLD AMP. 17A
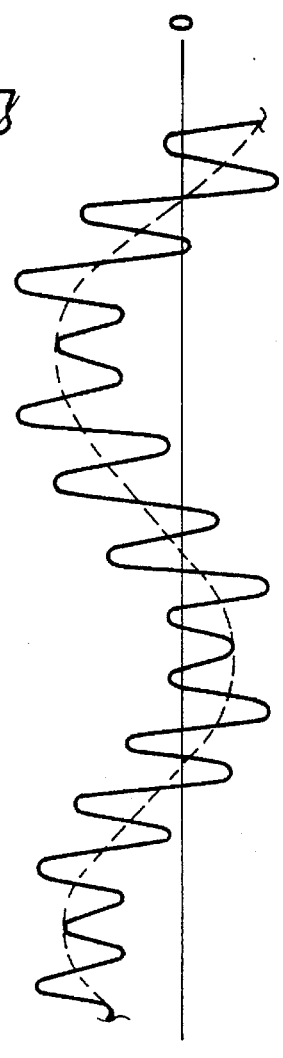
FIG.16c PUSH-PULL SIGNAL INCLUDING OFFSET
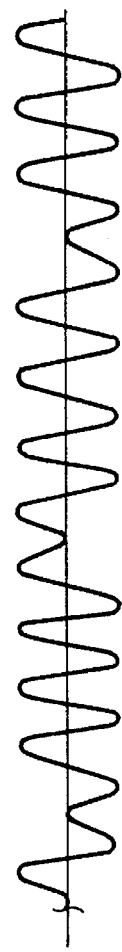
FIG.16d TRACKING ERROR SIGNAL

OPTICAL RECORDING MEDIUM AND RECORDING AND/OR REPRODUCING APPARATUS USING SUCH OPTICAL RECORDING MEDIUM

This is a divisional of application Ser. No. 08/189,543, filed Jan. 26, 1994 now U.S. Pat. No. 5,504,727.

BACKGROUND OF THE INVENTION

This invention relates to an optical recording medium using light in reproduction of a recorded data signal, and a recording and/or reproducing apparatus adapted to record a data signal onto the optical recording medium and to reproduce the data signal recorded on the optical recording medium, and more particularly to an optical recording medium capable of reproducing a data signal recorded thereon with a d.c. offset component produced at the time of reproduction of such recorded data signal being removed, and a recording and/or reproducing apparatus using such optical recording medium.

In an optical disc recording/reproducing apparatus using an optical disc as a recording medium, for the purpose of allowing a focused beam spot irradiated onto the optical disc to be positioned on a predetermined recording track at all times, tracking servo is carried out. This tracking servo is a servo to detect a quantity of deviation from a predetermined recording track formed on the optical disc as a tracking error signal to move a beam spot focused on the optical disc within the range of a predetermined deviation. In more practical sense, movement control of a focused beam spot position of laser beam is carried out so that the tracking error signal becomes equal to zero.

As the method of detecting a tracking error signal for the above-described tracking servo, there are, e.g., a push-pull method, a three-beam method, and the like.

The above-mentioned push-pull method is a system of detecting a return light reflected from the substrate of the optical disc by using a bisected photo detector to determine a tracking error signal by using a difference between the detected light quantities.

Meanwhile, in the push-pull method, when the object lens (objective) undergoes displacement in a direction perpendicular to the optical axis of this object lens in accordance with the tracking control, so the center of the bisected photo detector and the center of a diffracted light are not in correspondence with each other, a d.c. component may appear on a tracking error signal. This d.c. component is called a d.c. offset.

This d.c. offset occurs resulting from, in addition to the above-described deviation in the optical axis of the object lens, inclination in a radial direction of the optical disc, unevenness of the shape of grooves forming recording tracks provided in the optical disc, a difference between reflection factor of the groove and that of a mirror portion in which no groove is formed, a difference between a d.c. offset produced in the address area and that produced in the data area of the optical disc, and the like.

A circuit for detecting and correcting this d.c. offset component has been proposed.

In this d.c. offset correction circuit, signals obtained by detecting a return light reflected from the disc surface by using a bisected photo detector are delivered to a differential amplifier. The differential amplifier delivers a difference signal between signals detected by two detecting sections to first to third sample-hold circuits. These sample-hold circuits carry out sampling at timings delivered from a timing generator to the respective circuits.

In order to avoid the influence occurring as the result of the fact that a tracking error signal is lost immediately before the mirror portion formed on the optical disc, the first sample-hold circuit samples and holds a signal level of tracking error signal immediately before the mirror portion. This first sample-hold circuit releases sample-hold state after a light beam is passed through the mirror portion.

Further, the second sample-hold circuit samples and holds the tracking error signal immediately before the mirror portion to output a signal comprised of a tracking error signal immediately before the mirror portion including no d.c. offset component and a d.c. offset component. In addition, the third sample-hold circuit detects only the d.c. offset component included in the tracking error signal by sampling at the mirror portion.

The second and third sample-hold circuits, respectively, deliver output signals to the non-inverting terminal and the inverting terminal of a second differential amplifier. Thus, as a difference between these output signals, the second differential amplifier outputs, to a coefficient multiplying section, the tracking error signal immediately before the mirror portion including no d.c. offset component. The coefficient multiplying section multiplies the output difference, which is delivered from the second differential amplifier, by coefficient K to output it to the other terminal side of a summing amplifier. The summing amplifier is supplied on one end side thereof with an output from the first sample-hold circuit. The summing amplifier adds an output (tracking error signal immediately before the mirror portion) of the first sample-hold circuit and a corrected output signal through the coefficient multiplying section from the differential amplifier to output a corrected tracking error signal through output terminal.

In order to avoid such a d.c. offset, the optical disc recording/reproducing apparatus employs an offset canceling system based on a mirror portion correcting system in which in detecting a d.c. offset when a tracking servo is carried out to move bisected photo detector and an object lens in one body by using a bi-axial actuator or a uni-axial galvano mirror, etc. so that a focused beam spot falls within a predetermined range, a d.c. offset component is detected at the mirror portion provided on the optical disc to correct it.

However, since this system employs a subtraction system of subtracting a position movement component from a push-pull signal which is a difference output of the bisected photo detector to carry out tracking control, in the case where a coefficient K of the coefficient multiplying section constituting d.c. offset correcting circuit is not suitable, any error would occur in the tracking error signal. Further, since such a coefficient is dependent upon the position on the optical disc, there was the case where any adjustment is required resulting from the difference between the coefficient on the inner circumferential side and that on the outer circumferential side, etc. In such a case, with the circuit configuration of this system, the effect of the d.c. offset correction of the tracking error signal cannot be exhibited, so a circuit configuration and a mechanism for still more making improvement becomes complicated.

An optical disc recording/reproducing apparatus using the three-beam method can provide stable tracking operation, but adjustment for allowing two sub-beams on the both sides of a main beam to be placed at symmetric position relative to the recording track center in inner and outer circumferences of the optical disc is very complex.

Further, the applicant of this application has proposed a Differential Push Pull (hereinafter referred to as DPP) method as the push-pull offset canceling system by spatial division in the publication of the Japanese Patent Application Laid Open No. 94246/1986 (Tokkaisho 61-94246).

In accordance with this method, a pair of light beams are irradiated to an optical recording medium through an object lens with a spacing which is a multiple of odd of substantially one half of the track pitch to allow a pair of emitting beams from the optical recording medium to be respectively incident to a pair of bisected photo detecting elements to obtain a tracking error signal from a difference between respective detected outputs from the pair of bisected photo detecting elements to thereby remove a d.c. fluctuation of a tracking error signal based on movement in a direction perpendicular to the optical axis of the object lens or radial skew of the optical recording medium.

However, in the case of carrying out push-pull offset canceling by the DPP method, since a focused beam is divided into three light beam components by using a diffraction grating similarly to the three-beam method to use that sub-beam for detection of push-pull signal, the utilization efficiency of an emitted laser output becomes poor. For this reason, when a great quantity is required for sub-beam even if the focused beam is divided into three beam components, laser diode LD must emit a laser beam at a higher laser output, e.g., an output increased by 15% according to the above requirement.

Meanwhile, in the case where the reliability of laser diode LD is generally taken into consideration, there is the relationship that power of 2 of a laser output is proportional to inverse number of the life time of the laser diode with the laser output and the life time of the laser diode being as a parameter. Accordingly, when an attempt is made to improve the laser output, the life time of the laser diode becomes short by the above-described proportional relationship. Further, this method requires a diffraction grating which is an expensive part for dividing a light beam into three light beam components.

OBJECTS AND SUMMARY OF THE INVENTION

This invention has been made in view of actual circumstances as described above, and has one object to provide an optical recording medium such that in the case where that medium is applied to a recording and/or reproducing apparatus, an offset canceling is carried out with a simple circuit configuration by using inexpensive parts to permit the life time of the laser diode to be long, and another object to provide a recording/reproducing apparatus and a reproducing apparatus using an optical recording medium adapted to carry out precise d.c. offset canceling at the time of recording/reproduction by using the above-mentioned optical recording medium to permit improvement in the performance.

To achieve the above-described objects, in accordance with this invention, there is provided an optical recording medium including a recording area in which pairs of guide grooves are formed on the both sides of tracks for recording a data signal, wherein no guide grooves are formed in a predetermined area of the optical recording medium, and grooves are formed at the recording track center positions of the predetermined area.

In the preferred embodiment, the above-mentioned predetermined area indicates an area extending over a predetermined length along the recording track direction, and at east one predetermined area is provided in one circumference of the optical recording medium. This predetermined area may be used as an area for carrying out push-pull offset canceling or, e.g., a cut portion or a pit train therein is permitted to suitably have address information, etc. The groove formed at the track center position is caused to have the same width and depth as those of the guide groove. It is to be noted that the relationship between the recessed portion and the projected portion with respect to the groove (in the predetermined area) or the guide groove is relative to each other. For example, there may be employed a corresponding relationship such that the groove is the recessed portion and the recording track is the projected portion when viewed from the reflection surface side, or a corresponding relationship such that the portion corresponding to the groove is the projected portion and the recording track is the recessed portion oppositely to the above. In addition, the above-mentioned optical recording medium is not limited to an optical disc. Even if a recording medium, such as, for example, an optical card, an optical tape or an optical drum, etc. is employed, such a medium may be of the structure of the optical recording medium described above, thereby making it, possible to cancel d.c. offset, produced by the push-pull system.

A recording and/or reproducing apparatus using optical recording medium according to this invent,ion carries out recording/reproduction with respect to an optical recording medium where grooves are formed at track center positions in a predetermined area of the optical recording medium where recording tracks for recording a data signal are arranged between pairs of guide grooves. This apparatus comprises a bisected photo detector for detecting a return light of a laser beam irradiated onto the optical recording medium by bisected light receiving sections; a difference signal output amplifier for taking a difference between output signals from the respective light receiving sections of the bisected photo detector to take out a difference signal therefrom; a first sample-hold unit for sampling and holding a difference signal obtained from a recording/reproducing area of the optical recording medium; a second sample-hold unit for sampling and holding a difference signal from the predetermined area in which the groove is formed at the track center position of the optical recording medium; and an adder for adding outputs from the first and second sample-hold units, thus to remove a d.c. offset component included in an output signal from the difference signal output amplifier on the basis of an output signal from the adder.

In the preferred embodiment, elimination of a d.c. offset component included in an output signal from the difference signal output amplifier is carried out by an offset elimination unit adapted to implement a predetermined operation to an output signal from the adder to take a difference between the signal which has undergone such operation and an output signal from the difference signal output amplifier, thus to eliminate such d.c. offset component.

A recording/reproducing apparatus using an optical recording medium according to this invention carries out recording/reproduction by using an optical recording medium on which a data recording area, where pairs of guide grooves are formed on the both sides of tracks for recording a data signal, and a predetermined area, where no guide groove is formed and grooves are formed at the track center positions are caused to have the same length, and are arranged one after another in a track direction, one end side of the groove in the predetermined area overlaps with the data recording area, and an area including no groove is formed at the boundary between the other end side of the groove in the predetermined area and a next data recording area. This recording or reproducing apparatus comprises a bisected photo detector for detecting a return light of a laser beam irradiated onto the optical recording medium; a difference signal output amplifier for taking a difference between output signals from the bisected light detector to take out a difference signal; an inverting amplifier for inverting the polarity of the difference signal from the difference signal output amplifier; and a signal switching unit for carrying out switching between the difference signal from the difference signal output amplifier and an output signal from the inverting amplifier every boundary between the data recording area and the predetermined area. The signal switching unit respectively detects a start position and an end position of the predetermined area in the area where one end side of the groove in the predetermined area overlaps with the data recording area and in the area where no groove is formed on the other end side of the groove, thus to switch an input signal in accordance with the detected signal.

In the preferred embodiment, the signal switching unit carries out switching of the input signal on the basis of a sum signal of two signals outputted from the bisected photo detector. Detection of the start position and the end position in the predetermined area in switching is carried out by direction of change i.e., polarity of the sum signal. This switching is carried out at a frequency sufficiently higher than that in the servo band of an actuator for carrying out a tracking servo control.

In addition, a reproducing apparatus using an optical recording medium according to this invention reproduces an optical recording medium on which a data recording area where pairs of guide grooves are formed on the both sides of tracks for recording a data signal and a predetermined area where no guide groove is formed and grooves are formed at the track center positions are arranged one after another in a track direction. This reproducing apparatus comprises a bisected photo detector for detecting a return light of a laser beam irradiated onto the optical recording medium by bisected light receiving sections; a difference signal output amplifier for taking a difference between output signals from respective light receiving sections of the bisected photo detector to take out a difference signal; a subtracting unit supplied on one end side with a push-pull signal from the difference signal output amplifier and supplied on the other end side with a signal in which offset information included in a tracking error signal obtained from the groove at the track center position is multiplied by coefficient thus to cancel an offset component of the tracking error signal; a sampling timing generating unit for generating a timing signal for sampling an output signal obtained from the difference signal output amplifier; a sampling unit for sampling a signal delivered thereto in accordance with a control signal delivered from the sampling timing generating unit; and a hold coefficient multiplying unit for holding an output signal from the sampling unit and multiplying it by a coefficient.

In the preferred embodiment, the reproducing apparatus using optical recording medium applies, in an additive manner, to rough movement actuator for carrying out a rough movement control of the laser beam irradiation position with respect to the optical recording medium, i.e., the irradiation position of a beam spot in a radial perpendicular to the track, offset information outputted from the hold coefficient multiplying unit and an output from a low-pass filter for allowing a low-frequency component of an output signal from the subtracting unit to be passed therethrough.

Further, an output signal from the subtracting unit is delivered to the low-pass filter as a low frequency component extracting means for extracting an offset component. This low-pass filter outputs the extracted signal to the sampling unit.

The optical recording medium according to this invention is directed to an optical recording medium including a recording area where guide grooves are formed on both sides of tracks for recording a data signal, wherein no guide groove is formed in the predetermined area of the optical recording medium, and grooves are formed at the track center position to thereby allow the predetermined area to serve as an area for canceling a push-pull offset to cancel a d.c. offset included in the push-pull signal obtained from the predetermined area.

The recording/reproducing apparatus using optical recording medium according to this invention operates as follows. In carrying out recording/reproduction by using optical recording medium on which grooves are formed at the track center positions of the predetermined area of the optical recording medium where recording tracks for recording a data signal are arranged between a pair of guide grooves, a return light of a laser beam irradiated onto the optical recording medium is received and detected by using a bisected photo detector to determine a difference signal between detected outputs by using difference signal output amplifier to respectively hold signals having output phases different by 180 degrees by using first and second sample-hold units in accordance with an output signal of the sample-hold signal supply unit to add these signals by using the adder to thereby take out only d.c. fluctuation component to remove, by using d.c. offset eliminating unit, d.c. offset component superimposed on a tracking error signal by taking a difference between, e.g., a signal having an amplitude which is one half of the d.c. fluctuation component and the difference signal.

Further, the recording/reproducing apparatus using optical recording medium according to this invention is directed to an apparatus for carrying out recording/reproduction by using an optical recording medium on which a data recording area, where pairs of grooves are formed on the both sides of recording tracks for recording a data signal, and a predetermined area, where no guide groove is formed and grooves are formed at the track center positions, are caused to have the same length and are arranged one after another in a track direction, one end side of the groove in the predetermined area overlapping with the data recording area. An area including no groove is formed at the boundary between the other end side of the groove in the predetermined area and the next data recording area. A return light of a laser beam irradiated onto the optical recording medium is received and detected by using a bisected photo detector, a difference signal indicating a difference between output signals from the bisected photo detector and an output signal from inverting amplifier for inverting the polarity of the difference signal are delivered to signal switching unit, and a switching output signal of the signal switching unit is delivered to actuator to an eliminate d.c. offset component by making use of the characteristic of the actuator.

The reproducing apparatus using optical recording medium according to this invention is directed to a reproducing apparatus using an optical recording medium for reproducing an optical recording medium on which a data recording, area where pairs of guide grooves are formed on the both sides of tracks for recording a data signal, and predetermined area, where no guide groove is formed and grooves are formed at the track center positions. The reproducing apparatus detects a return light of a laser beam irradiated onto the optical recording medium by respective bisected light receiving sections of the bisected photo detector to take a difference between output signals from respective light receiving sections of the bisected photo detector by using the difference signal output unit to take out a difference signal as a push-pull signal to input the push-pull signal to one end side of a subtracting unit An output of the subtracting unit is delivered to sampling unit to a sample and hold the delivered signal in accordance with a sampling timing signal generated at the sampling timing generating unit to multiply the sampled signal by a coefficient at a hold coefficient multiplying unit to feed the multiplied signal thus obtained back to the other end side of the subtracting unit to thereby detect a d.c. offset component in the predetermined area where groove is formed at the track center position to eliminate offset component included in the push-pull signal by the d.c. offset component thus detected.

The reproducing apparatus using optical recording medium applies, in an additive manner, to a rough movement actuator for carrying out rough movement control of irradiation position of beam spot in a direction perpendicular to the track, offset information outputted from the hold coefficient multiplying unit, and an output of a low-pass filter for allowing a low frequency component of a tracking error signal to be passed therethrough, which is delivered with an output signal from the subtracting unit being as a drive signal to thereby drive the rough movement actuator to make a control so that a beam spot is always placed at a neutral point which is the position of the track center to extend the frequency band of a signal for carrying out drive control of the rough movement actuator to the side of a higher frequency, thus to improve the operating accuracy.

BRIEF DESCRIPTION OF THE DRAWINGS

FIG. 14 is an envelope waveform of a tracking error signal produced when obliquely traversing the recording track of the optical disc.

FIGS. 15a to 15e are model views showing output waveforms outputted at respective portions of the reproducing apparatus using the optical recording medium shown in FIG. 13.

FIGS. 16a to 16d are waveform diagrams for explaining elimination of a d.c. offset component on the basis of actual output waveforms outputted at respective portions of the reproducing apparatus using optical recording medium shown in FIG. 13.

DESCRIPTION OF THE PREFERRED EMBODIMENTS

Initially, a push-pull method which is one of methods of detecting a tracking error for tracking servo used in a recording/reproducing apparatus using an optical recording medium will be described.

Figure 1:
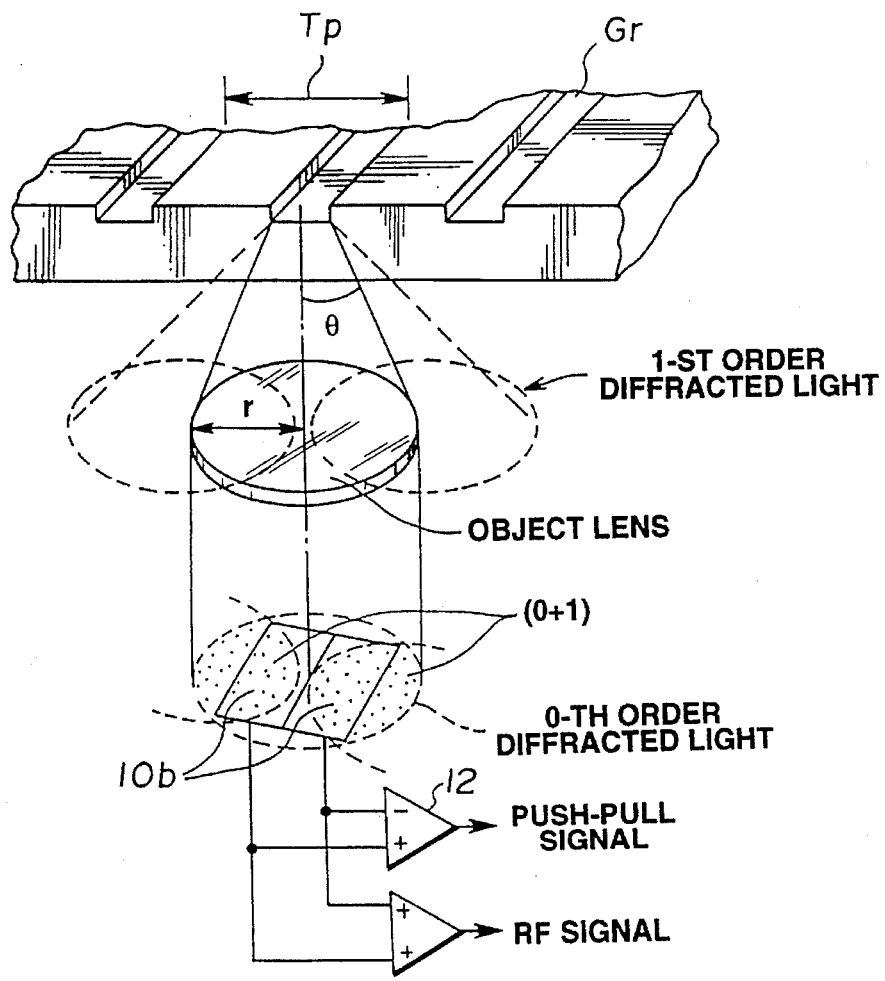
FIG. 1 is a model view showing the configuration for detecting a push-pull signal or a RF signal by a return light from a optical disc surface by using the push-pull system.

This push-pull method is a system of detecting a return light reflected from a substrate of a optical disc by using a bisected photo detector to determine a tracking error signal by using this detected light quantity difference. When the track pitch $T_p$ of the optical disc becomes equal to the spot diameter, the guide groove looks like a diffraction grating. The slanting line portion (0+1) shown in FIG. 1 indicates the area where the 0-th order diffracted light obtained as the result of the fact that the return light delivered to bisected photo detector 10b through an object lens by the effect of the diffraction grating is passed through the object lens and the first order diffracted light obtained as the result of the fact that the return light is partially passed through the object lens overlap with each other.

Figure 2:
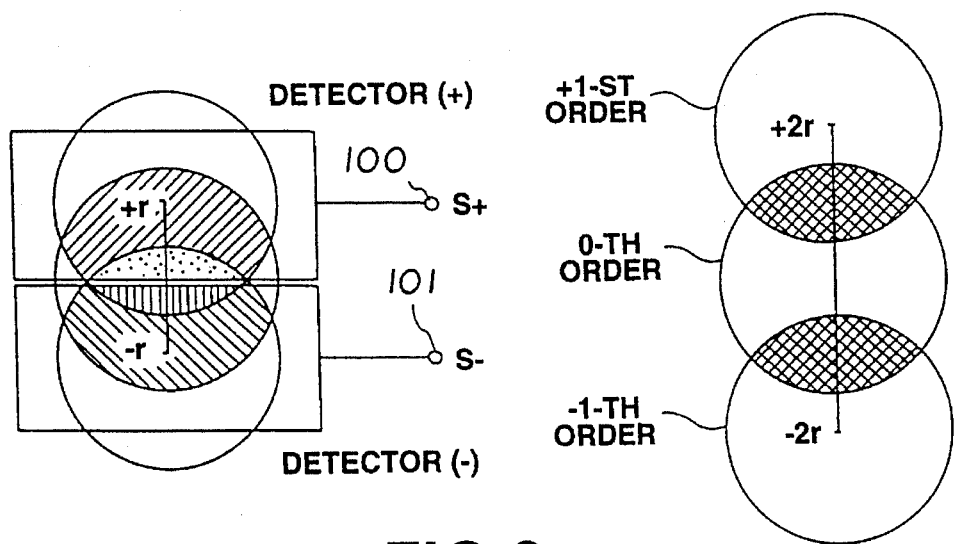
FIG. 2 is a model view for explaining the relationship between a diffracted light of a return light and a bisected photo detector shown in FIG. 1.

Depending upon the degree of overlap, the bisected photo detector 10b delivers an output signal $S_+$ from the (+) side of the detector shown in FIG. 2 to one end side of a differential amplifier 12 through output terminal 100. Further, the bisected photo detector 10b delivers an output signal $S_-$ from the (-) side of the detector to the other side of the differential amplifier 12 through output terminal 101. The differential amplifier 12 determines, from these input signals, a push-pull signal which is a difference signal (see FIG. 1).

Figure 3:
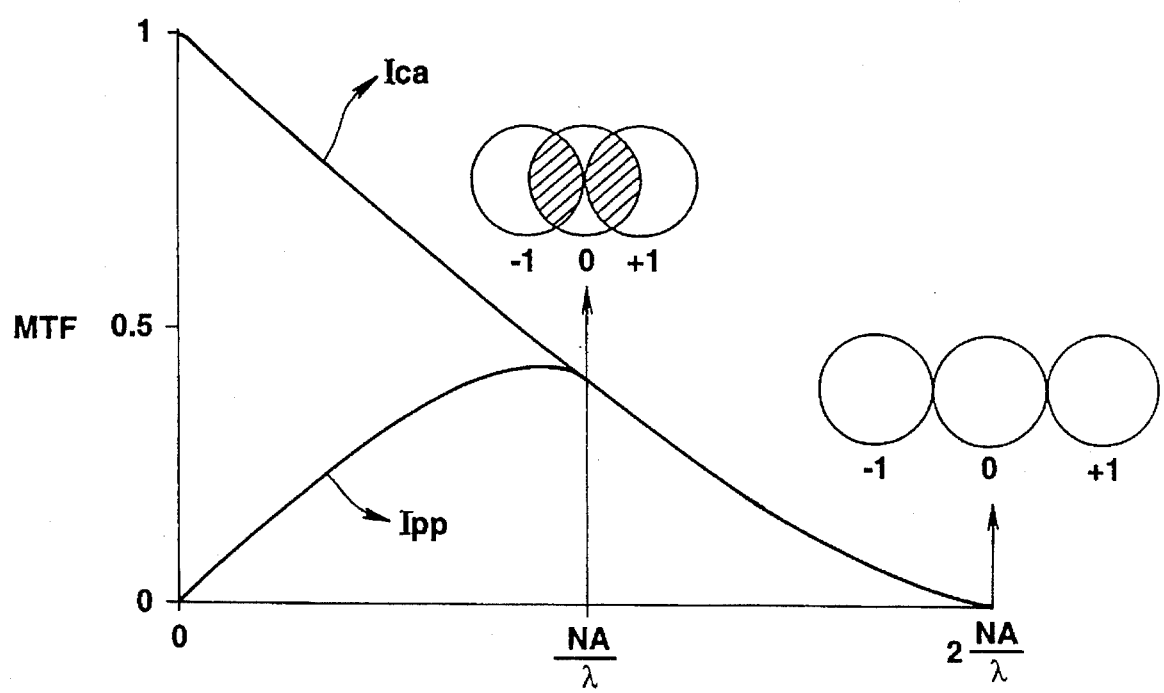
FIG. 3 is a graph showing the relationship between spatial frequency and MTF.

MTF value varies by output signals $S_+$, $S_-$ respectively outputted from the bisected photo detector 10b in depending upon the overlapping degree of rays of the first order diffracted light +1, -1 relative to the 0-th order diffracted light. The relationship between spatial frequency ν indicated by dividing, e.g., numerical aperture NA of the object lens by wavelength λ and MTF varies in dependency upon the overlapping degree of the diffracted light, shown in FIG. 3. Referring to FIG. 3, MTF value of a RF signal which is a sum signal of output signals $S_+$, $S_-$ from the bisected photo detector 10b and MTF value of a push-pull signal which is a difference signal between both signals are respectively indicated by $I_{CA}$ and $I_{pp}$. The level of the MTF value $I_{CA}$ which is MTF of the RF signal attenuates as the spatial frequency ν increases, and becomes equal to zero at 2NA/λ. Further, MTF value $I_{pp}$ gradually increases from the spatial frequency ν=0 to a value in the vicinity of NA/λ, and follows the same attenuation curve as the curve of the MTF value $I_{CA}$ of the RF signal becomes equal to zero at 2NA/λ. As apparent from FIG. 3, seen that a value which satisfies both MTF value $I_{CA}$ of the RF signal and MTF value $I_{pp}$ of the push-pull signal is NA/λ.

Meanwhile, in the above-described push-pull method, the object lens fluctuates in accordance with the tracking control. As a result, when the center of the bisected photo detector and the diffracted light center do not correspond with each other, a d.c. component may appear on a tracking error signal. This d.c. component is a d.c. offset.

This d.c. offset occurs resulting from, in addition to the optical axis deviation of the above-described object lens, inclination in a radial direction of the optical disc, unevenness of the groove shape of the optical disc, a difference between the reflection factor at the groove portion and that at the mirror portion including no groove, difference between a d.c. offset produced in the address area and that produced in the data area of the optical disc, and the like.

Figure 4:
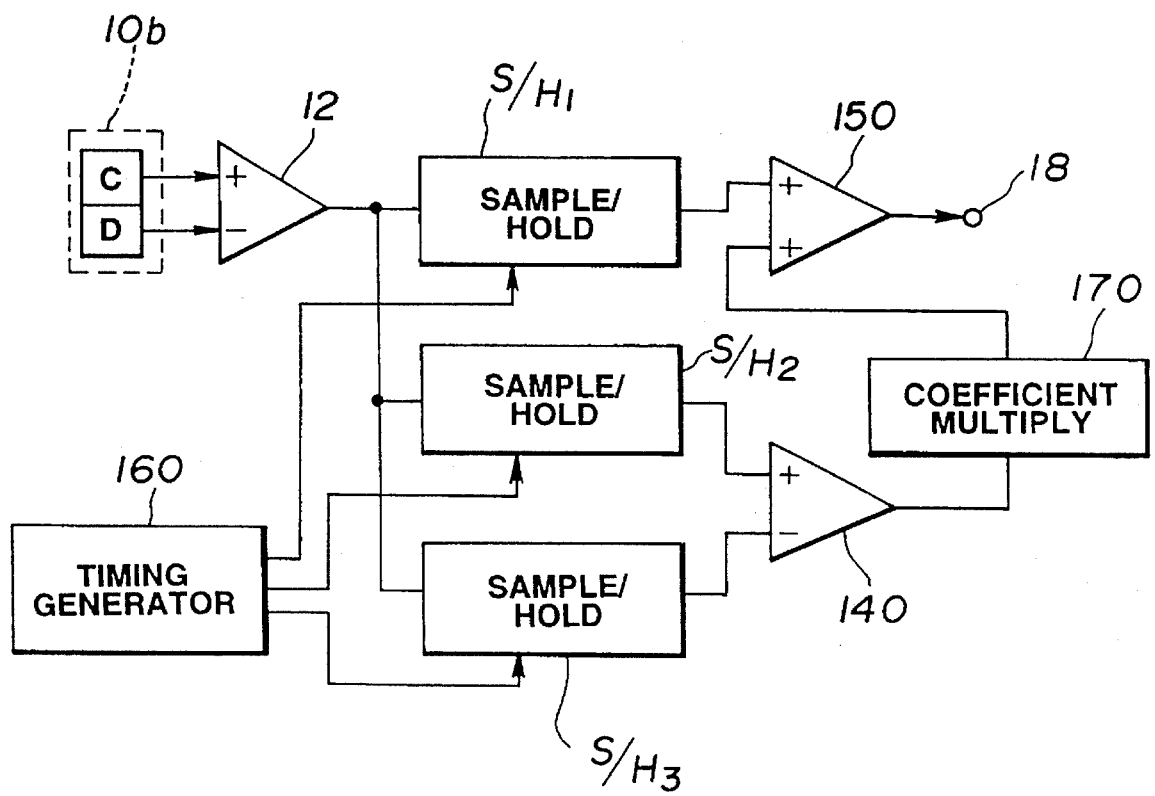
FIG. 4 is a circuit diagram showing, in a block form, a circuit for eliminating d.c. offset.

As an example of the circuit configuration for detecting and correcting this d.c. offset component, a typical d.c. offset correction circuit is shown in FIG. 4.

In this d.c. offset correction circuit, a return light reflected from the disc surface is detected at detecting sections C, D of bisected photo detector 10b. The detected signals thus obtained are delivered to differential amplifier 12. This differential amplifier 12 delivers a difference signal between signals detected at the detecting sections C and D to sample-hold circuits S/H$_1$, S/H$_2$, S/H$_3$. These sample-hold circuits S/H$_1$, S/H$_2$, S/H$_3$ carry out sampling at timings respectively delivered from a timing generating unit 160.

In this example, in order to avoid the influence occurring as the result of the fact that the tracking error signal is lost immediately before the mirror portion formed on the optical disc, the sample-hold circuit S/H$_1$ samples and holds the signal level of the tracking error signal immediately before the mirror portion. This sample-hold circuit S/H$_1$ releases sample-hold state after a light beam is passed through the mirror portion.

Further, the sample-hold circuit S/H$_2$ samples and holds the tracking error signal immediately before the mirror portion to output a signal comprised of a tracking error signal immediately before the mirror portion including no d.c. offset component and a d.c. offset component. Further, the sample/hold circuit S/H$_3$ detects only the d.c. offset component included in the tracking error signal by sampling at the mirror portion.

These sample-hold circuits S/H$_2$, S/H$_3$ respectively deliver output signals to a non-inverting terminal and an inverting terminal of a differential amplifier 140 to output, as an output difference, tracking error signal immediately before the mirror section including no d.c. offset component to a coefficient multiplying section 170. The coefficient multiplying section 170 multiplies an output difference delivered thereto by coefficient K to output the multiplied value to the other side of a summing amplifier 150. Further, the summing amplifier 150 is supplied on one end side with an output from the sample-hold circuit S/H$_1$. The summing amplifier 150 adds an output (tracking error signal immediately before the mirror portion) of the sample-hold circuit S/H$_1$ and a corrected output signal through the coefficient multiplying section 170 from the differential amplifier 140, thus to output a corrected tracking error signal through output terminal 18.

As stated above, in order to avoid d.c. offset, the optical disc recording/reproducing apparatus uses an offset canceling system based on a mirror portion correcting system in which in detecting a d.c. offset when a tracking servo is carried out to move a bisected photo detector and an object lens in one body by using a bi-axial actuator or a uni-axial galvano mirror, etc. so that a focused beam spot falls within a predetermined range, a d.c. offset component is detected at the mirror portion provided on the optical disc to correct it.

However, since this system employs a subtraction system of subtracting a position movement component from a push-pull signal which is a difference output of the bisected photo detector to carry out tracking control, in the case where coefficient K of the coefficient multiplying section 170 of the circuit is not suitable, any error may take place in the tracking error signal. Further, since such coefficient is dependent upon position on the optical disc, there was the case where adjustment is required resulting from difference between coefficient on the inner circumferential side and that on the outer circumferential side, and the like. In such a case, with the circuit configuration of this system, the effect of the d.c. offset correction of the tracking error signal cannot be exhibited. As a result, the circuit configuration and the mechanism for more improvement becomes complicated.

Embodiments of an optical recording medium, a recording/reproducing apparatus using optical recording medium, and a reproducing apparatus using optical recording medium according to this invention will now be described with reference to the attached drawings. Explanation will be given in connection with an optical disc as an example of the optical recording medium.

In the optical disc, recording tracks for recording a data signal are arranged between pairs of guide grooves (hereinafter referred to as grooves). Among optical discs, there are some optical discs where a mirror portion is provided without provision of the pair of grooves. In such optical disc, a quantity of a return light from the mirror section is utilized to remove a d.c. offset occurring in the tracking control.

Figure 5:
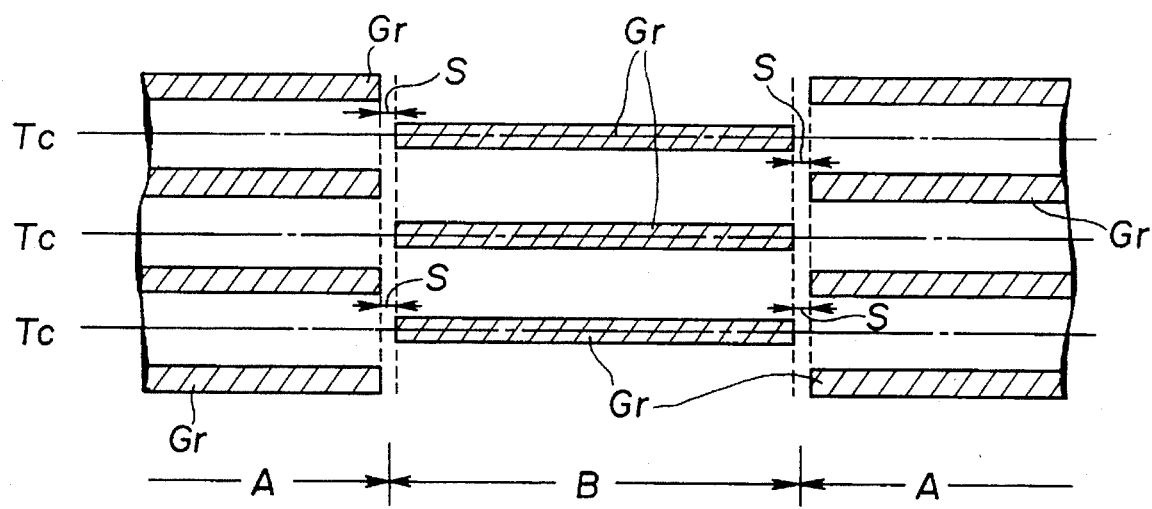
FIG. 5 is a model view for explaining the format of an optical recording medium according to this invention.

FIG. 5 is a model view for explaining the format of the optical disc according to this invention.

The optical disc of this invention includes a data recording area A serving as a recording area where grooves Gr serving as a guide groove are formed on the both sides of tracks for recording a data signal and a d.c. offset cancel area B for canceling d.c. offset by the push-pull system serving as a predetermined area of the optical disc. In the d.c. offset cancel area B, the pair of grooves Gr are not formed and grooves are formed at the track center positions Tc thereof. The groove Gr at the track center position Tc has the same depth as the groove Gr.

It is to be noted that the above-mentioned groove is not limited to the groove Gr of the recessed portion. The groove may be formed so that the groove portion is projected and the recording area (i.e., recording track) is recessed. Recording having such a relationship is called groove recording.

Further, in the format of the optical disc shown in FIG. 5, space areas S are respectively formed between the end portion of the data recording area A where pairs of grooves are formed and the d.c. offset cancel area B. The d.c. offset cancel area B indicates an area extending over a predetermined length along the track direction. At least one area B is provided in one circumference of the optical disc. This predetermined area may be used as an area for carrying out push-pull offset cancel, or, e.g., a cut portion or a pit train therein is permitted to have address information, etc. By allowing the predetermined area of the optical disc to have address information for d.c. offset cancellation without providing the mirror portion like space area S, the capacity of the optical disc can be extended.

The principle for removing a d.c. offset component included in a tracking error signal at the time of carrying out recording/reproduction by using the above-described disc will now be described with reference to FIGS. 6 and 7.

Actually, in the case of carrying out a tracking control with respect to the optical disc, a laser beam emitted from a laser diode is irradiated onto the optical disc surface through a collimator lens, a beam splitter, and an object lens. A return light reflected from the optical disc surface is received by a bisected photo detector through the object lens and the beam splitter.

Figure 6A:
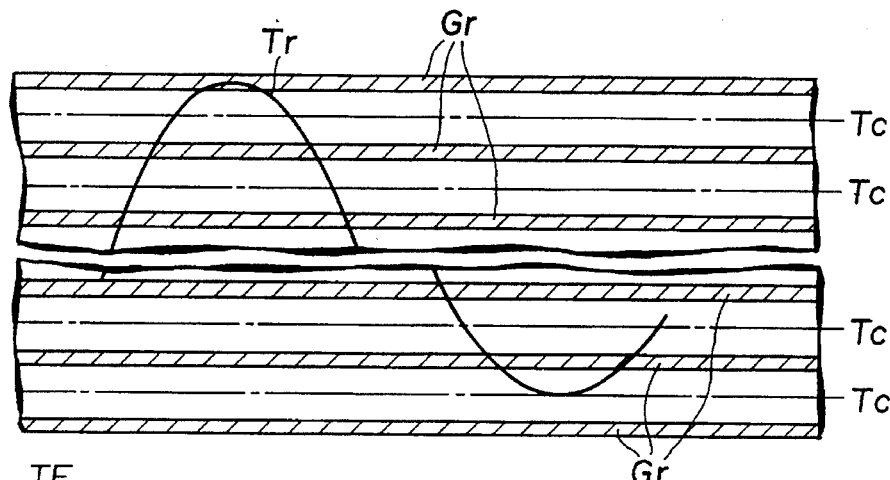
FIGS. 6a to 6d are fundamental model views for explaining the relationship between a locus when the beam spot traverses the recording area of the optical disc and a tracking error signal including d.c. offset produced by detecting a return light from the optical recording medium.
Figure 6B:
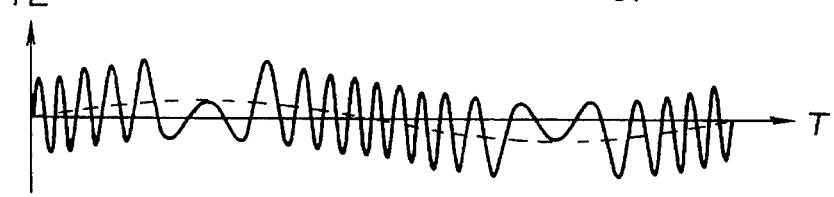

When the object lens is kept parallel to the above-described optical disc surface, i.e., the distance therebetween is fixed to traverse the recording track as shown in FIG. 6(a), since the bisected photo detector is fixed, a tracking error signal TE including d.c. fluctuation component (i.e., d.c. offset component) of FIG. 6(b) corresponding to the position displacement quantity X of the object lens relative to each track center is outputted as a difference signal between signals respectively outputted from the bisected photo detector. Namely, the tracking error signal TE has the waveform shown when traversing the optical disc comprised of the data recording area A in FIG. 5.

Figure 6C:
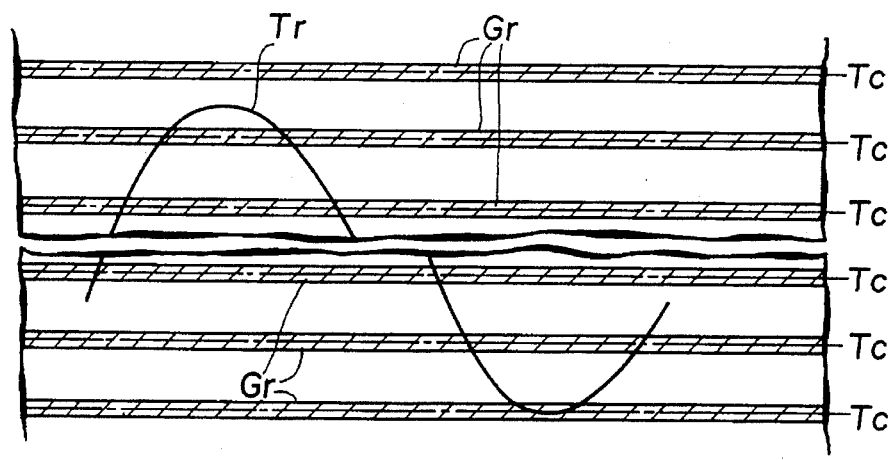

Further, in the case of traversing the optical disc comprised of d.c. offset cancel area B where groove Gr is provided at the central position Tc of the track shown in FIG. 6(c) while allowing the object lens to be kept in parallel to the optical disc surface, a tracking error signal TE outputted has a waveform having a d.c. offset of the same phase relationship as that of the tracking error signal TE outputted when traversing the groove in the recording track area A of FIG. 5. (see FIG. 6(d)). The waveform of the tracking error signal shown in FIG. 6(d) results in a waveform shifted by 180 degrees relative to the waveform of the tracking error signal (waveform of FIG. 6(b)) outputted when traversing the recording track area A, As stated above, as apparent from FIG. 6(b) and FIG. 6(d), d.c. offsets which are d.c. fluctuation components both vary in such a manner that they are in phase.

In the case where this optical disc is constituted as described above to thereby employ a circuit configuration based on the push-pull method used in an ordinary optical disc recording/reproducing apparatus, tracking error signals having phases different from each other by 180 degrees produced in respective areas A, B, including d.c. offset components in phase with each other, are outputted.

Figure 6D:
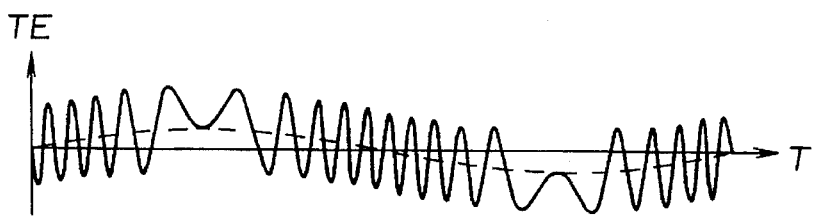

When tracking error signals having phases opposite to each other, including d.c. offset components in phase with each other are applied, the tracking error signals are canceled, and d.c. offset components in phase with each other included waveforms in FIGS. 6(b), 6(d) are added. Thus, there results a waveform in which the amplitude of the d.c. offset in the waveform of FIG. 6(b), 6(d) becomes double. By reducing the amplitude (level) of the output waveform shown in FIG. 7(a) to one half, the same amplitude as that of the d.c. offset component included in waveform of FIGS. 6(b), 6(d) is obtained as the amplitude of the d.c. offset component (see FIG. 7(b)).

Figure 7A:
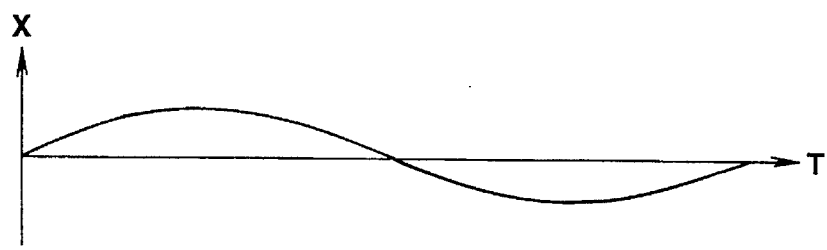
FIGS. 7a to 7c are output waveform diagrams used for explaining the principle for determining a tracking error signal including no d.c. offset.
Figure 7B:
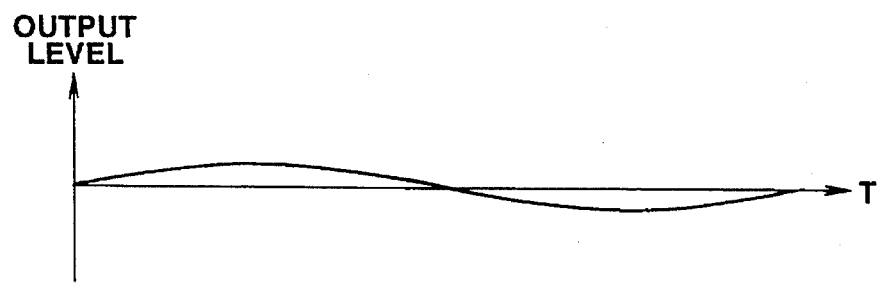
Figure 7C:
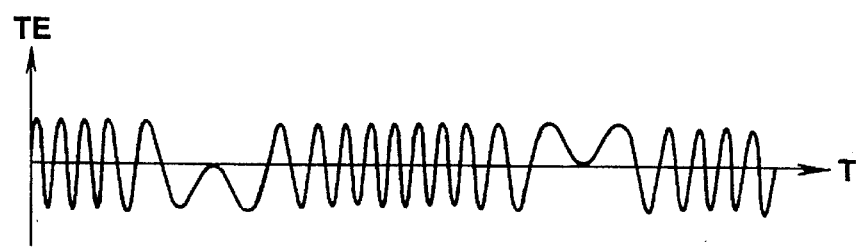

In view of this, by subtracting the d.c. offset component shown in FIG. 7(b) from the tracking error signal including a d.c. offset component as shown in FIG. 6(b), for example, it is possible to determine a tracking error signal including no d.c. offset component shown in FIG. 7(c).

Explanation will now be given in connection with the configuration and the operation of the essential part of an optical disc recording/reproducing apparatus as an example of a recording/reproducing apparatus using an optical recording medium for carrying out recording/reproduction of data while carrying out a servo control by a tracking error signal including no d.c. offset by using the above-described principle with respect to an optical disc which is the optical recording medium of this invention. It is to be noted that the entire configuration of the recording/reproducing apparatus using optical disc will be described later.

Figure 8:
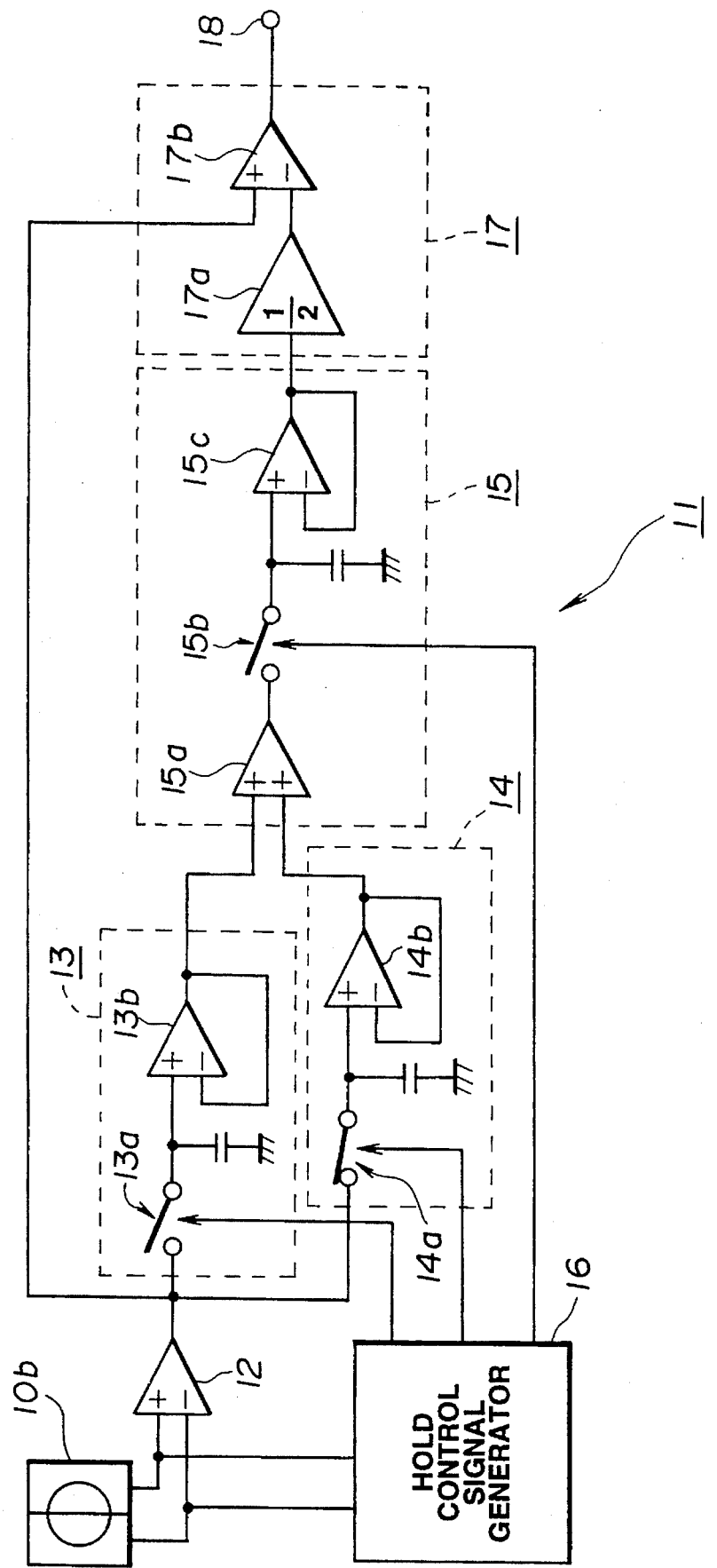
FIG. 8 is a schematic circuit diagram showing the configuration of optical fixed unit and reproduction signal processing unit which are the essential parts within the optical pick-up mechanism used in the optical disc recording/reproducing apparatus according to this invention.

FIG. 8 is a circuit diagram showing the configuration of an optical fixed unit 10 and a reproduction signal processing unit 11 in the optical pick-up mechanism used in the optical disc recording/reproducing apparatus.

The optical fixed unit 10 is composed of a laser diode (hereinafter referred to as LD) 10a (see FIG. 11) and a bisected photo detector 10b serving as bisected photo detecting means for detecting a return light of a laser beam irradiated onto the optical disc by bisected light receiving sections.

The bisected photo detector 10b outputs two signals detected at respective light receiving sections to the reproduction signal processing unit 11 for implementing a signal processing.

The reproduction signal processing unit 11 is composed of a difference signal output amplifier 12, sample-hold sections 13, 14, an adding output section 15, a hold control signal generating circuit 16, and a d.c. offset eliminating section 17.

The difference signal output amplifier 12 is used as a difference signal output means for taking a difference between output signals from respective light receiving sections of the bisected photo detector 10b to take out a difference signal.

The sample-hold sections 13, 14 are first sample-hold means for sampling and holding a difference signal obtained from the recording or reproducing area A of the optical disc, and second sample-hold means for sampling and holding a difference signal obtained from d.c. offset cancel area B which is the predetermined area where grooves are respectively formed at the track center positions of the optical disc. The sample-hold section 13 is composed of a changeover switch 13a for signal sampling, and a hold amplifier 13b provided for holding a delivered signal. In addition, the sample-hold section 14 is composed of a changeover switch 14a for signal sampling, and a hold-amplifier 14b provided for holding a delivered signal.

Further, the adding output section 15 serves as adding (summing) means for adding outputs from the sample-hold sections 13, 14. The adding output section 15 is composed of a summing amplifier 15a for adding output signals from the sample hold sections 13, 14, a changeover switch 15b for carrying out switching operation in accordance with a sampling timing signal from a hold control signal generating circuit 16 which will be described later, and a hold circuit 15c for holding a delivered added result through the changeover switch 15b.

The hold control signal generating circuit 16 delivers timings for sampling signals delivered to the sample-hold sections 13, 14 and the adding output section 15.

The d.c. offset eliminating section 17 serves as a tracking error detecting means for implementing a predetermined operation to an output signal from the adding output section 15 to take out a difference signal between the signal to which operation has been implemented and an output signal from the difference signal output amplifier 12 as a tracking error signal TE. In this example, the d.c. offset eliminating section 17 is composed of a multiplier 17a for adjusting the level of an output signal of the adding output section 15 to the level of a difference signal from the difference signal output amplifier 12, and a difference signal output amplifier 17b for eliminating the d.c. offset component.

The operation of the circuit shown in FIG. 8 will now be described with reference to output waveforms at respective portions corresponding to output waveforms shown in FIGS. 6 and 7.

The bisected photo detector 10b delivers two signals detected at respective light receiving sections to difference signal output amplifier 12. The difference signal output amplifier 12 delivers a tracking error signal including a d.c. offset to the sample-hold section 13, 14 in the reproduction signal processing unit 11.

The sample-hold sections 13, 14, respectively, allow changeover switches 13a, 14a to be turned ON in accordance with a sampling timing signal delivered from the hold control signal generating circuit 16 so as to sample a tracking error signal obtained from the end portion of the recording or reproduction area A and the leading portion of the d.c. offset cancel area B. Thus, hold circuits 13b, 14b hold tracking error signals each including d.c. offset in respective areas A, B of the optical disc. Tracking error signals each including d.c. offset in respective areas A, B correspond to signals shown in the above-mentioned FIGS. 6(b), 6(d). In this case, d.c. offsets have the same polarity, whereas tracking error components have polarities opposite to each other.

The adding output section 15 is composed of summing amplifier 15a, changeover switch 15b, and hold circuit 15c as described above. Tracking error signals outputted from sample-hold sections 13, 14 are added at the summing amplifier 15a to output an added value to changeover switch 15b. The changeover switch 15b is turned ON in accordance with a sampling timing signal delivered from the hold control signal generating circuit 16. At this time, the hold circuit 15c inputs an output signal delivered from the changeover switch 15b to the non-inverting terminal side to hold this signal.

This will be described on the basis of correspondence between FIGS. 6 and 7 previously mentioned. The hold circuit 15c adds waveforms of FIGS. 6(b) and 6(d). As a result, tracking error signals are canceled with each other, and d.c. offset components in phase with each other included in waveforms in FIGS. 6(b), 6(d) are added. Thus, a waveform having an amplitude twice greater than that of the d.c. offset included in the waveform of FIG. 6(b), 6(d) is outputted as shown in FIG. 7(a).

In the d.c. offset elimination section 17, input signal of waveform having an amplitude twice greater than that of the d.c. offset (see FIG. 7(a)) is inputted to multiplier 17a. Multiplication coefficient of the multiplier 17a is, e.g., ½. Accordingly, an output of the multiplier 17a has the same amplitude as that of the d.c. offset component included in the tracking error signal (corresponding to FIG. 7(b)). The difference signal output amplifier 17b for eliminating d.c. offset component is supplied on the inverting input terminal side with an output from the multiplier 17a, and is supplied on the non-inverting input terminal side with an output from the difference signal output amplifier 12. When these signals are delivered to the difference signal output amplifier 17b for eliminating d.c. offset component, it provides an output as a tracking error signal including no d.c. offset component through output terminal 18.

By employing such a configuration, it is possible to eliminate a d.c. offset component included in a tracking error signal obtained in accordance with the push-pull system by one spot. By allowing a beam irradiated to be one spot, the necessity of dividing an output of the laser is eliminated. Followed by this, even if a lower output level is employed, it becomes possible to carry out precise tracking servo in accordance with the push-pull system. Accordingly, since the reliability of LD is ensured, the life time of LD can be elongated.

Another embodiment of an optical recording medium and a recording/reproducing apparatus using the optical recording medium according to this invention will now be described.

In this embodiment, there is used an optical disc as an optical recording medium in which a data recording area A, where grooves Gr are formed as a pair of guide grooves on the both sides of tracks for recording a data signal, and a d.c. offset cancel area, B as a predetermined area, where no groove Gr is formed and grooves are formed at the track center positions Tc, are caused to have the same length and are arranged one after another in a track direction, one end side of groove Gr of the d.c. offset cancel area B overlaps with the data recording area A (area C of FIG. 9), and an area including no groove (area D of FIG. 9) is formed at the boundary between the other side of groove Gr of the d.c. offset cancel area B and the next data recording area A.

The above-mentioned area D is a portion corresponding to the space area S indicating the boundary of the optical disc in the previously descried embodiment.

Figure 9:
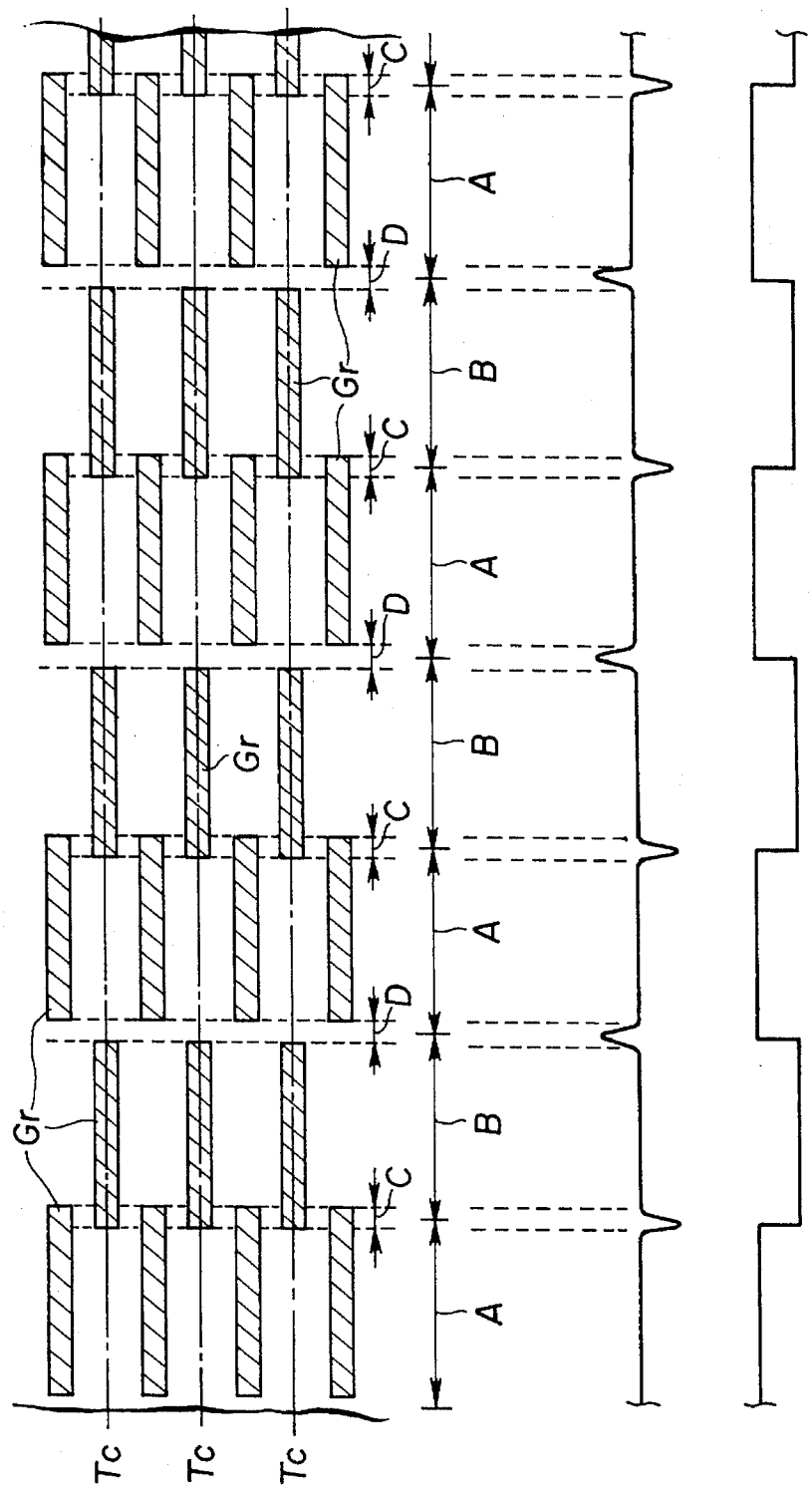
FIGS. 9a to 9c are model views for explaining another embodiment of the format in the optical disc of this invention.

The explanatory model view of the format of the above-described optical disc is shown in FIG. 9.

Further, the groove Gr at the recording track center position Tc is caused to have the same width and depth as those of the groove. Further, even if the portion corresponding to the groove Gr is formed to be projected in place of the recessed portion to carry out so called groove recording, the same effect can be obtained.

Figure 10:
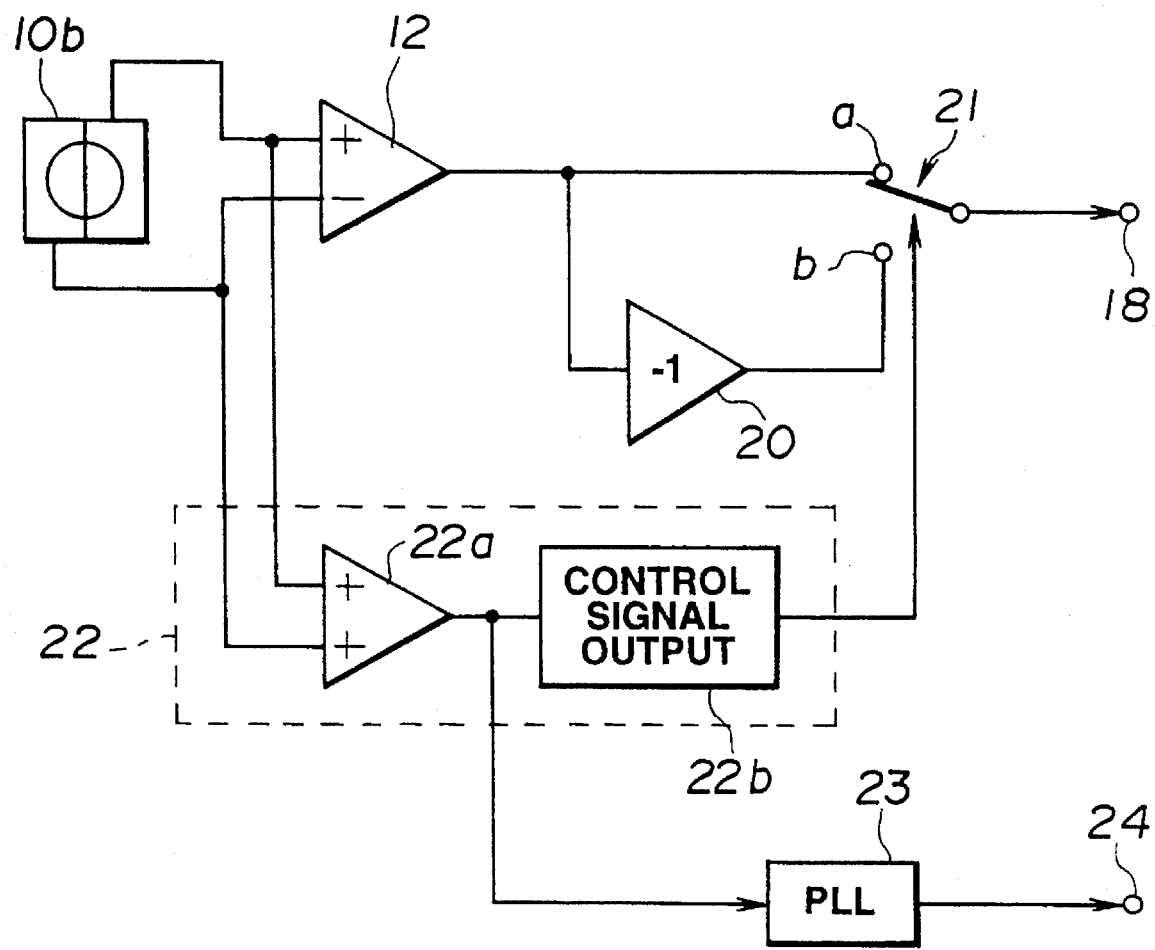
FIG. 10 is a circuit diagram showing the configuration of optical fixed unit and reproduction signal processing unit within the optical pick-up mechanism of the optical disc recording/reproducing apparatus when an optical disc to which the format shown in FIG. 9 is implemented is used.

A recording/reproducing apparatus using the optical disc for carrying out recording/reproduction of data by using this optical disc will now be described with reference to FIG. 10. The entire configuration of the optical disc recording/reproducing apparatus will be described later, and the same reference numerals are attached to portions common to reference numerals attached to the above-mentioned drawings. FIG. 10 is a circuit diagram showing the configuration of the optical fixed unit 10 and reproduction signal processing unit 11 in the optical pick-up mechanism used in the optical disc recording/reproducing apparatus.

The circuit configuration of the optical disc recording/reproducing apparatus comprises bisected photo detector 10b as bisected photo detecting means for detecting a return light of a laser beam irradiated onto the optical disc by bisected light receiving sections, a differential signal output amplifier 12 as difference signal output means for taking a difference between output signals from respective light receiving sections of the bisected photo detector 10b to take a difference signal, an inverting amplifier 20 serving as inverting means for inverting the polarity of the difference signal from the difference signal output amplifier 12, and a changeover switch 21 as signal switching means for carrying out switching between the difference signal from the difference output amplifier 12 and an output signal from the inverting amplifier 20 for every boundary between the data recording area A and the d.c. offset cancel area B.

The changeover switch 21 detects the start position and the end position of the d.c. offset cancel area B in the area C where one end side of groove GF of the d.c. offset cancel area B overlaps with the data recording area A and the area including no groove on the other end side of groove Gr to carry out switching of an input signal in dependent upon this signal. To realize this, a switching control signal is delivered from a switching control unit 22 to the changeover switch 21.

The bisected photo detector 10b carries out photoelectric conversion so that respective electric signals are provided and delivered to difference signal output amplifier 12. Further, the bisected photo detector 10b delivers the detected signals to the switching control unit 22. An output of the difference signal output amplifier 12 is a tracking error signal including a d.c. offset. This tracking error signal is delivered to terminal a of the changeover switch 21, and is also delivered to the inverting amplifier 20. The inverting amplifier 20 inverts the level of the delivered tracking error signal to deliver it to terminal b of the changeover switch 21.

The changeover switch 21 carries out switching in accordance with a control signal delivered from the switching control unit 22. The switching control unit 22 includes a sum signal output amplifier 22a and a control signal output circuit 22b. The sum signal output amplifier 22a outputs, to the control signal output circuit 22b, a signal of negative or positive polarity corresponding to a return light quantity shown in FIG. 9(b) when passed through the area C, or the area D of the optical disc in the state where tracking is ON.

The control signal output circuit 22b detects an output of a sum signal of negative in polarity by a predetermined threshold level set in advance to convert it to a binary pulse signal shown in FIG. 9(c). The control signal output circuit 22b judges the timing at which the binary pulse signal shown in FIG. 9(c) falls from level "H" to level "L" to be the start position of the d.c. offset cancel area B to output a switching control signal so as to carry out switching to terminal b side of the changeover switch 21.

Further, the control signal output circuit 22b similarly judges the rise from level "L" to level "H" to be the end position of the d.c. offset cancel area B when it detects a sum signal of positive in polarity by a predetermined threshold level set in advance to carry out switching to terminal a side of changeover switch 21. As stated above, the changeover switch 21 switches a tracking error signal outputted in dependent upon the data recording area A and the d.c. offset cancel area B.

The tracking error signal outputted through output terminal 18 is delivered to an actuator such as a voice coil motor for driving the optical pick-up section, etc. This actuator has, as the transmission characteristic of the actuator, a transmission characteristic having a low resonance frequency from several Hz to about 100 Hz, which is a mass/compliance system and is generally called a "secondary system". As the characteristic required for a actuator in addition to the above, the delay characteristic is satisfactory as the phase characteristic, the sensitivity is sufficient, there is no secondary resonance up to the range of high frequency, and the like, The actuator of such a characteristic has a satisfactory delay as the phase characteristic. When this actuator is operative by filter action in a manner of an integration circuit, in the case where signals switched and delivered for every respective area are viewed from a viewpoint of frequency, d.c. offset components which are lower frequency component are averaged. In practice, since d.c. offset included in tracking error signal indicates spatial movement of the optical system, it is derived that movement of the actuator is dependent upon d.c. offset of a lower frequency band component.

Namely, in this embodiment, output signals having d.c. offset components which have polarities different from each other and substantially the same level switched and outputted from the changeover switch 21 are added and averaged, whereby d.c. offsets are canceled. Further, since the actuator has the characteristic having sufficient sensitivity, and the characteristic that there is no secondary resonance up to the range of high frequency, etc., when switching is carried out by changeover switch 21 in dependency upon the data recording area A and the d.c. offset cancel area B by a frequency sufficiently higher than that of the tracking servo frequency band, the actuator will operate in correspondence with only the tracking signal.

Accordingly, the recording/reproducing apparatus using optical disc in this embodiment is adapted so that when an optical disc having data recording area A and d.c. offset cancel area B which are caused to have the same length is used, the apparatus eliminates, e.g., an offset of the DC amplifier or offset followed by position movement of the actuator, thus making it possible to conduct a tracking servo control of the actuator with respect to the optical disc. By utilizing the characteristic of the actuator, the circuit configuration can be simplified.

Further, the sum signal output amplifier 22a delivers an output signal to a phase locked loop (hereinafter referred to as PLL) circuit 23. The PLL circuit 23 outputs a master clock through output terminal 24.

By constituting the apparatus configuration for carrying out recording/reproduction with respect to the optical disc of such a format as described above, d.c. offset can be removed by a simpler configuration using a single spot of a beam irradiated, and the life time of the LD can be elongated. In addition, master clock can be obtained from PLL with overhead being hardly produced. Thus, use of an external clock can be made.

Figure 11:
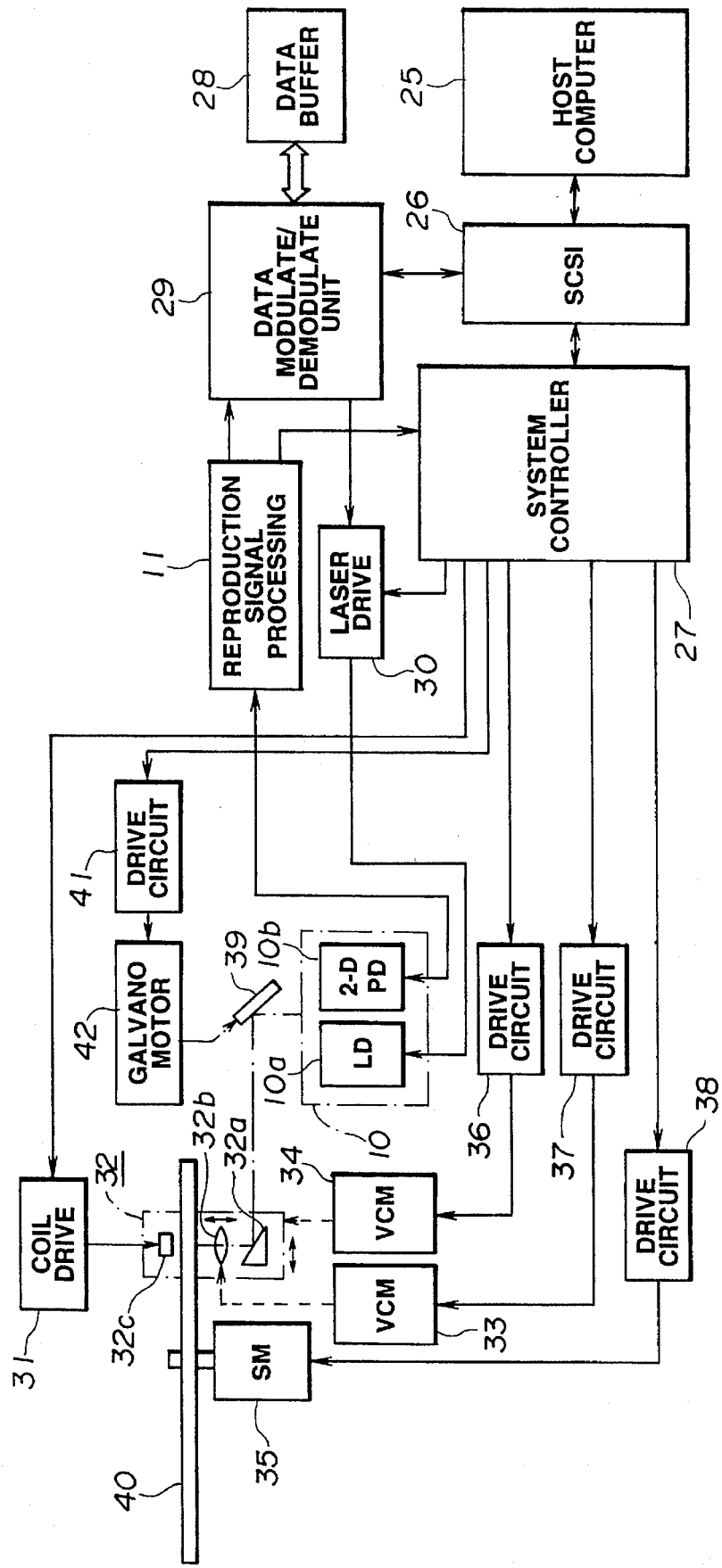
FIG. 11 is a block diagram showing the entire circuit configuration of an optical disc recording/reproducing apparatus according to this invention.

The entire configuration of the previously described optical disc recording/reproducing apparatus is shown in FIG. 11. In this embodiment, a magneto-optical disc (NO) is used as the optical disc.

The optical disc recording/reproducing apparatus inputs and outputs from a host computer 25 or to the host computer 25 through a small computer system interface (hereinafter referred to as SCSI interface) 26. The SCSI interface 26 transmits or receives data to/from a data buffer 28 in a bi-directional manner in accordance with control of the system control let 27. In addition, the data buffer 28 transmits or receives data to or from a data modulating/demodulating unit 29.

The data modulating/demodulating unit 29 modulates binary data delivered from the data buffer 28 to deliver it to a laser drive unit 30. Further, the data modulating/demodulating unit 29 demodulates data delivered from the reproduction signal processing unit 11 which has been referred to in the previously described embodiment.

The system controller 27 delivers control signals to the laser drive unit 30, a coil drive unit 31 and a slider 32, and drive circuits 36–38 for voice coil (VCFI) motors 34, 33 and a spindle motor 35. The voice coil motors 33, 34 and the spindle motor 35 operate in accordance with drive signals outputted from drive circuits 37, 36 and 38.

The laser drive unit 30 delivers a laser drive signal to LD 10a to allow it to emit a laser beam. The LD 10a irradiates a laser beam emitted therefrom to a magneto-optical disc 40 through a 45° reflection mirror 32a and an object lens 32b included within the slider 32 through a galvano mirror 39. The voice coil motor 34 carries out a very small displacement of the slider 32 in accordance with control of the system control let 27 to position it from a track at the present address position onto a track at the target address position. In addition, the voice coil motor 33 carries out a displacement control of the position of object lens 32b of the slider 32 in accordance with control of the system controller 27 for the purpose of carrying out focus servo.

Since the optical recording medium used is an magneto-optical disc, the system controller 27 carries out drive of the LD10a, and delivers a drive signal to a head element 32c through the coil drive unit 31.

The optical disc recording/reproducing apparatus drives slider 32 and head element 32c so that they undergo displacement fin one body at the time of recording to carry out magnetic field modulation recording at the target address position of the magneto-optical disc 40. Further, the optical disc recording/reproducing apparatus receives reflected light of the laser beam irradiated onto the magneto-optical disc 40 through slider 32 at the time of reproduction by using bisected photo detector (2D-PD) 10b based on the push-pull system. This bisected photo detector 10b carries out photoelectric conversion to output an output signal to the reproduction signal processing unit 11.

In order to carry out a tracking servo control at the time of recording and reproduction, the reproducing signal processing unit 11 delivers an off track quantity detected on the basis of a detected output of the bisected photo detector 10b to the system controller 27. This system controller 27 drives a motor 42 for galvano mirror through the drive circuit 41 so that a detected off track quantity is caused to be zero. This galvano mirror motor 42 fluctuates galvano mirror 39 to carry out a tracking servo control.

In this embodiment, the reproduction signal processing unit 11 has a circuit configuration for eliminating a d.c. offset of the previously described DC amplifier or a d.c. offset included in a tracking error signal produced as the result of the fact that it carries out a tracking servo control based on the push-pull system.

Further, the reproduction signal processing unit 11 outputs an output signal to a data modulating/demodulating unit 29.

The optical disc recording/reproducing apparatus demodulates, at the data modulating/demodulating unit 29, a delivered signal into binary data to output modulated data to host computer 25 through data buffer 28, SCSI interface 26.

When such a configuration is employed, a d.c. offset which becomes a problem in the tracking servo control based on the push-pull system by one laser beam spot, the life time of LD can be elongated. Further, the optical disc recording/reproducing apparatus scans the optical disc to deliver, e.g., a hold signal outputted to PLL circuit, thereby making it possible to obtain a master clock with overhead being hardly produced. Thus, use of an external clock can be made.

The optical disk used in this embodiment is of a structure such that data recording area A, where pairs of guide grooves are formed on the both sides of tracks for recording a data signal, and d.c. offset cancel area B, where no guide groove is formed and grooves are formed at the central positions of the track, are arranged one after another in a track direction. Namely, when viewed from a radial direction of an optical disc where recording tracks are formed in a spiral form or in a concentrical form, in the case where the spatial arrangement between grooves serving as a pair of adjacent guide grooves with respect to a certain track is assumed to be division of 360 degrees in the radial direction, the track center position Tc corresponds to the position at which the spatial arrangement is apart from grooves by 180 degrees. As stated above, d.c. offset cancel area B for carrying out d.c. offset canceling is provided on the optical disc.

Further, on the optical disc shown in FIG. 12(a), with a view to allowing the d.c. offset cancel area B to have address information, areas where a groove is formed and an area including no groove are provided at the track center position Tc. With respect to the address information, e.g., information from the portion where no groove is formed is dealt as data "1". Signals respectively outputted from the bisected photo detector 10b of FIG. 10 are delivered to the amplifier, and are outputted as a sum signal, i.e., a RF output signal (see FIG. 12(b)). Address information is read out on the basis of the sum signal.

The bisected photo detector 10b shown in FIG. 10 outputs a difference signal, i.e., a push-pull signal shown in FIG. 12(c) through differential amplifier 12. The difference signal shown in FIG. 12(c) indicates the case where a d.c. offset component takes place on the positive side by position movement, inclination of the optical axis, skew, etc. of galvano mirror moved by driving actuator for fine adjustment. On the other hand, FIG. 12(d) shows the case where a d.c. offset component takes place on the negative side oppositely to that of FIG. 12(c).

Meanwhile, the groove shape in the optical disc is generally molded by transfer from a master disc arranged within a forming metal mold. In this molding, an uneven portion may take place in the land portion or the groove portion a by defect of the groove portion of the master disc itself by the transfer process of the groove portion including the groove portion peeling process from the metal mold. By such an unevenness, e.g., the width of the groove of the above-described land portion and the width of a pair of grooves provided on the both sides of the land portion may vary. For this reason, a quantity of a return light from the optical disc with respect to an irradiated laser beam varies, giving rise to the necessity to adjust a coefficient value K for matching the condition. In the case where the value of the coefficient K is not suitable, with the feed forward circuit configuration by the above-described embodiment, there is the possibility that d.c. offset component cannot be sufficiently corrected.

Figure 13:
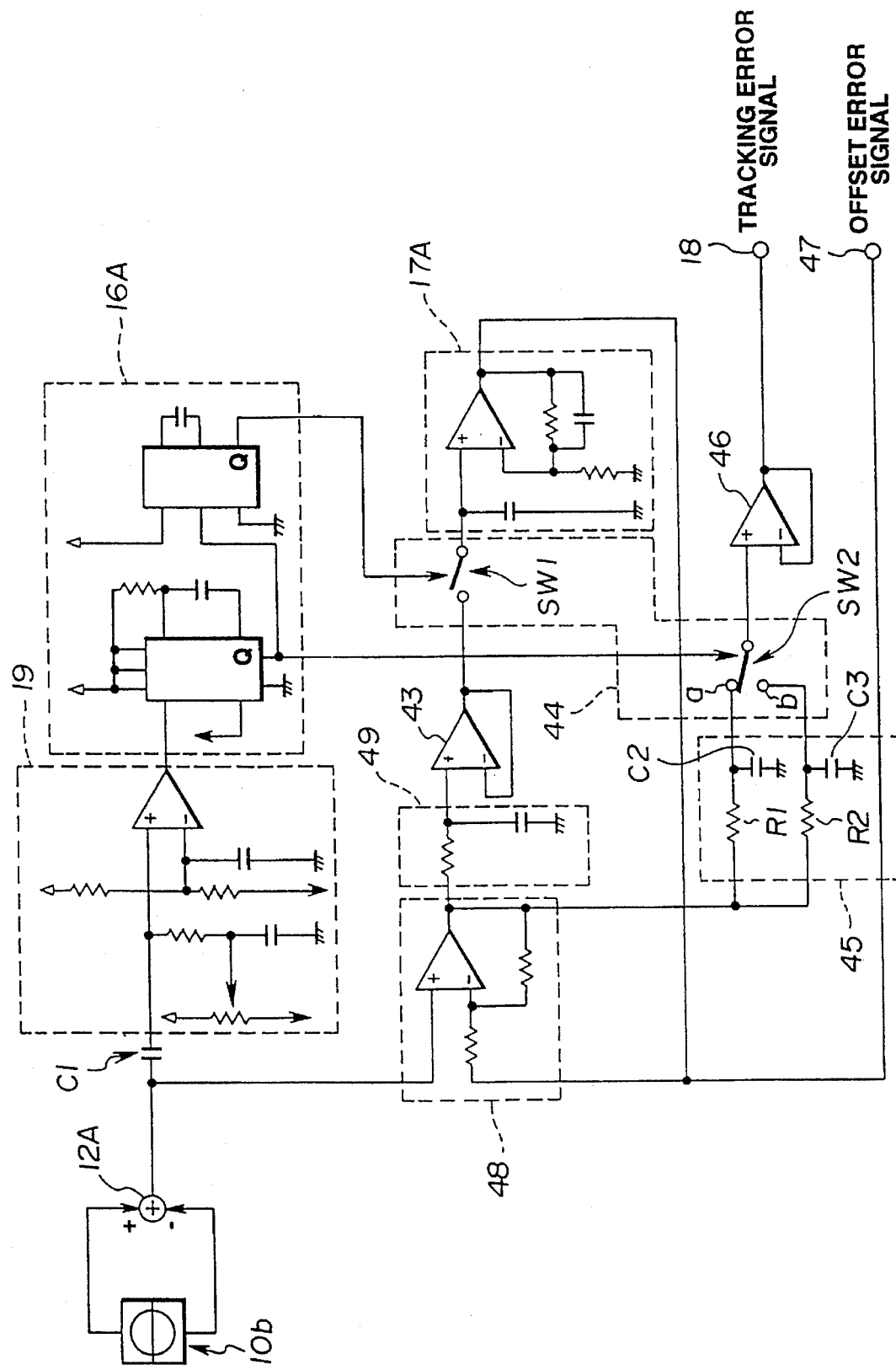
FIG. 13 is a circuit diagram showing, in a block form, the essential part of a reproducing apparatus using optical recording medium according to this invention.

An example of a reproducing apparatus for precisely canceling d.c. offset irrespective of the condition of grooves which are grooves of the optical disc is shown in FIG. 13.

The reproducing apparatus shown in FIG. 13 uses the above-described optical disc, and comprises bisected photo detector 10b, an adder 12A, a level comparison section 19, a sampling timing generating section 16A, a differential amplifier 48 for canceling d.c. offset, a sampling section 44, and a hold coefficient multiplying section 17A.

The bisected photo detector 10b is a bisected photo detector means for detecting, by bisected light receiving sections, a return light of a laser beam irradiated onto, e.g., no groove region on the data recording area or the groove at the track center position in the optical disc. The bisected photo detector 10b delivers output signals to the adder 12A as a difference signal output means for taking a difference between output signals from respective light receiving sections of the bisected photo detector 10b to take out a difference signal, i.e., a push-pull signal.

The adder 12A delivers the push-pull signal to one end side of d.c. offset canceling differential amplifier 48 as the subtracting means. Further, a d.c. component of an output signal of the adder 12A is cut by capacitor C1. The signal thus obtained is delivered to a sampling timing generating section 16A as sampling timing generating means for generating a timing signal for sampling it through the level comparison section 19.

A signal obtained by multiplying offset information included in a tracking error signal obtained from the guide groove Gr at the track center position Tc by coefficient is fed back and is inputted to the other side of the d.c. offset canceling differential amplifier 48. When such a signal is delivered, as described later, the d.c. offset canceling differential amplifier 48 eliminates a d.c. offset component included in the push-pull signal delivered from the adder 12A to output a tracking error signal from which the d.c. offset component is canceled. The cause of occurrence of the d.c. offset and the canceling operation thereof will now be described later.

In order to carry out cancellation of the d.c. offset, the d.c. offset canceling differential amplifier 48 delivers an output signal through a low-pass filter (hereinafter referred to as LPF) 49 and an amplifier 43 to sampling section 44. The sampling section 44 is a sampling means for sampling a delivered signal in accordance with a control signal delivered from the sampling timing generating section 16A, and is comprised of changeover switches SW1, SW2. These changeover switches SW1, SW2 carry out ON/OFF switching of input signals delivered in accordance with control signals delivered from the sampling timing generating section 16A, respectively.

The changeover switch SW1 delivers, when turned ON, an output of the amplifier 43 to a hold coefficient multiplying section 17A as the hold coefficient multiplying means for holding a sampled signal and multiplying it by a coefficient. The hold coefficient multiplying section 17A delivers an output signal to the other side of the d.c. offset canceling differential amplifier 48. The hold coefficient multiplying section 17A outputs an output signal as an offset error signal through output terminal 47.

The d.c. offset canceling differential amplifier 48 cancels an input signal delivered to one side, i.e., a d.c. offset included in the push-pull signal. The d.c. offset canceling differential amplifier 48 delivers a tracking error signal as an output signal from which d.c. offset is canceled to the filter section 45. This filter section 45 includes two low-pass filters which are respectively comprised of a resistor R1, a capacitor C2; and a resistor R2, a capacitor C3.

The above-mentioned two low-pass filters are such that one is a low-pass filter having a short time constant and the other is a low-pass filter having a long time constant. When a signal obtained by sampling the d.c. offset cancel area B is passed through the low-pass filter side having the long time constant, gap portions of anti-phase occurring on an envelope of a signal shown in FIG. 14, for example, having a signal waveform before it is passed through the low-pass filter are integrated and disappear. On the other hand, when a signal is passed through the low-pass filter on the shorter time constant side, the signal shown in FIG. 14, for example, is outputted as it is.

As stated above, respective filters of the filter section 45 integrate signals delivered thereto on the basis of time constants that those filters have to send output signals to terminals a, b of the changeover switch SW2. By switching and selecting signals caused to be through filter section 45 having different time constants by using changeover switch SW2, it is possible to output a tracking error signal as it is through the filter section 45, and to hold and output a signal from the d.c. offset cancel area B. By employing such a configuration, it is possible to finely output the tracking error signal.

As described above, the gap portion of the envelope shown in FIG. 14 corresponds to a cut portion of guide groove Gr offset-arranged in a direction spatially perpendicular to the track, i.e., in a disc radial direction in the d.c. offset cancel area B. The envelope waveform of the push-pull signal shown in FIG. 14 is a waveform obtained in the case where the optical disc of the previously described structure is used, a light beam is traversed in a direction perpendicular to tracks formed in a spiral form or in a concentrical form.

The changeover switch SW2 selects any one terminal in accordance with a control signal delivered from the sampling timing generating section 16A. Namely, the sampling timing generating section 16A outputs a control signal to select a side of the changeover switch SW2 for time period of the data recording area A and to select terminal b side of the changeover switch SW2 for time period of the d.c. offset cancel area B where address information, etc. is written.

By switching and selecting the changeover switch SW2, a clean (i.e., waveform distortion free) tracking error signal is sampled. This sampled signal is outputted through a hold amplifier 46 and output terminal 18. In accordance with the tracking error signal, a galvano mirror motor GM for driving and controlling the galvano mirror which is an actuator for fine movement control is controlled.

The operation of the above-described circuit configuration will now be described with reference to the timing chart shown in FIG. 15.

Figure 12:
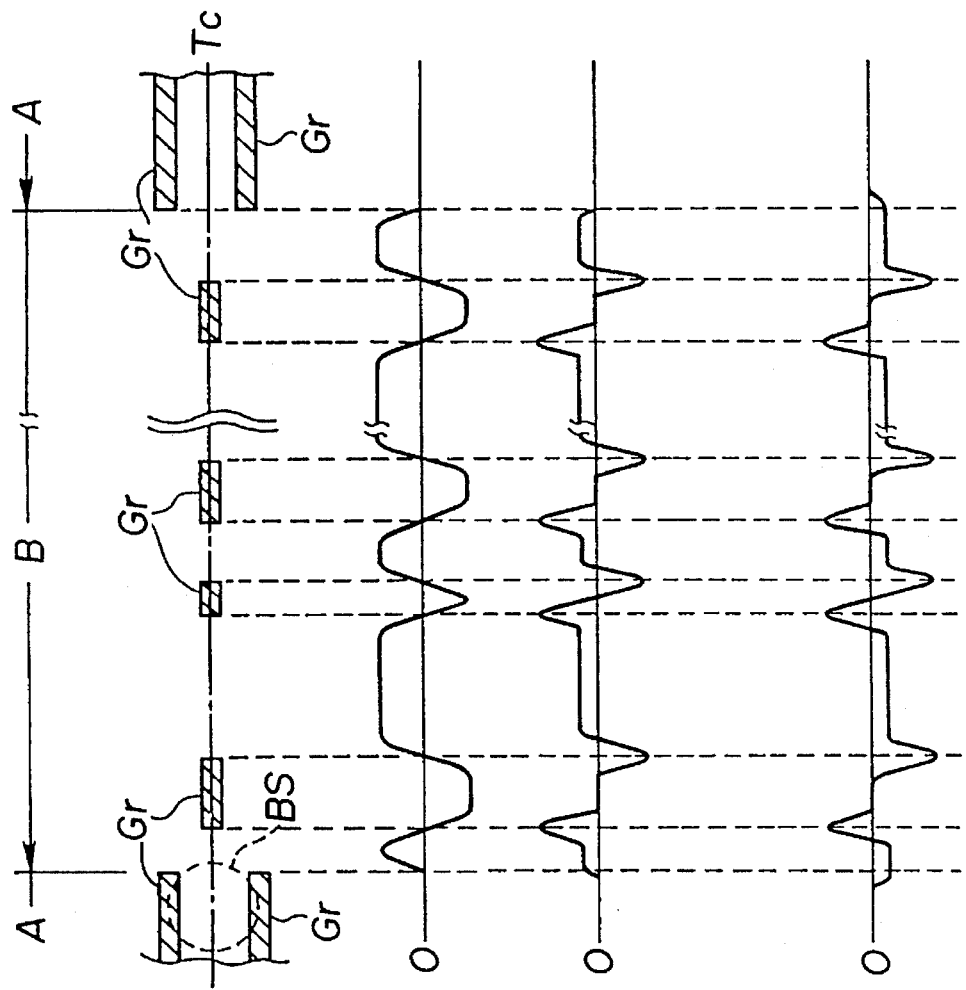
FIGS. 12a to 12d are model views showing a d.c. offset component included in a push-pull signal outputted from the bisected photo detector when the optical disc according to this invention is used.

Since beam spot BS shown in FIG. 12 deviates from track center Tc by position movement, inclination of the optical axis, or skew, etc. when moved along the track, any offset is produced in a push-pull signal obtained from adder 12A when the area B is scanned (see modellic waveform diagram of FIG. 15(a)).

By allowing push-pull signal including d.c. offset component from adder 12A to be passed through capacitor C1, it is sent to level comparison section 19 as a signal in which d.c. offset component (shown in FIG. 15(b)) is cut. The level comparison section 19 carries out level comparison of the push-pull signal on the basis of the threshold level indicated by broken lines of FIG. 15(b). The resultant signal which has undergone level comparison has a waveform in a pulse form shown in FIG. 15(c). The level comparison section 19 delivers this output signal to sampling timing generating section 16A. The sampling timing generating section 16A is comprised of, e.g., mono-multivibrators cascade-connected and adapted to output control signals for controlling sampling timings from respective output terminals Q. FIG. 15(d) shows a control signal delivered to the changeover switch SW1. The time period of level "H" of this control signal is a sampling time period indicating the time period of the offset cancel area B where address information, etc. is recorded.

Generally, in the optical recording medium such as optical disc, etc., the ratio of data recording areas A is sufficiently greater than that of d.c. offset cancel areas B. For this reason, the tracking control operation is carried out with respect to the data recording area A. In an ordinary state, that control operation is carried out with respect to tracks of the data recording area A. A control is carried out so that the push-pull signal in the data recording area A becomes equal to zero.

When any offset followed by object lens movement, etc. occurs, in the case where servo is carried out to allow a push-pull signal on which any offset is superimposed to be equal to zero, the beam spot on the recording medium undergoes a positional shift (in an opposite direction) by a quantity corresponding to offset relative to the track center. When push-pull signals in the data recording area A and the d.c. offset cancel area B are taken into consideration, the track deviation component the data recording area in A and track deviation component the d.c. offset cancel in area B have polarities opposite to each other because they have phases opposite to each other. Further, since offset components followed by the object lens movement, etc. have the same polarity, the signal level is zero in the data recording area A, but when the beam spot moves to the d.c. offset cancel area B, a d.c. level OFs corresponding to the offset component appears. The changeover switch SW1 samples this d.c. level in accordance with the sampling signal.

While the above-described tracking servo operation has been described in the case where an action to allow the push-pull signal to be zero is made, also in the case where the push-pull signal is not zero, it is possible to detect d.c. offset components from sampling signals obtained from the data recording area A and the d.c. offset cancel area B.

In this way, a d.c. offset component OFs included in a tracking error signal shown in a model form in FIG. 15(a) is obtained as the waveform shown in FIG. 15(e) by allowing it to be passed through low-pass filter 49 and amplifier 43.

An actual example of waveforms of d.c. offset component OFs is shown in FIG. 16. The sampling waveform of the tracking error signal of FIG. 16 is a waveform obtained in the case of moving the beam spot in a vertical direction to tracks while providing tracking servo to carry out an operation to traverse tracks, so called a track jump. Broken lines in FIG. 16 indicate a d.c. offset component in the case where noise components of an actual waveform are averaged by allowing a tracking error signal to be passed through the low-pass filter 49.

By the changeover switch SW1, d.c. offset component OFs included in the tracking error signal shown in FIG. 16(a) is sampled. This d.c. offset component is obtained in the case of traversing a plurality of tracks, This d.c. offset component OFs is obtained by detecting a beam spot position deviating from the track center in the d.c. offset cancel area B as apparent from the sampling time period, The d.c. offset component detected in the area B is sent to hold coefficient multiplying section 16A. The hold coefficient multiplying unit 16A carries out an amplification of a signal corresponding to multiplication of held d.c. offset component OFs by coefficient K to deliver it to the other side of d.c. offset canceling differential amplifier 48 (see FIG. 16(b)).

The d.c. offset canceling differential amplifier 48 is supplied on one side with a push-pull signal including d.c. offset component (see FIG. 16(c)). The d.c. offset canceling differential-amplifier 48 carries out subtractive input of d.c. offset components in phase with each other to cancel these d.c. offset components. Thus, the d.c. offset canceling differential amplifier 48 outputs a tracking error signal in which d.c. offset component of FIG. 16(d) is eliminated. In this way, the reproducing apparatus can control the operation of respective controlled units on the basis of a tracking error signal including no d.c. offset component.

By employing such a configuration, the balance between d.c. levels occurring in two areas of the data recording area A and the d.c. offset cancel area B is prevented from being destroyed, thus making it possible to cancel the d.c. offset component. Since a method of constituting a feedback loop to compulsorily ensure balance between d.c. levels is employed without adding d.c. offset components to cancel them, parameter change of the optical recording medium or non-linearity with respect to deviation of an offset quantity occurring by fluctuation of the galvano mirror does not become problem, thus making it possible to precisely carry out control. In addition, the necessity of detecting narrow mirror portion provided for canceling offset in the format of the optical recording medium is eliminated, thereby allowing a broad band amplifier to become unnecessary. Thus, the cost of the reproducing apparatus is reduced and an amplifier of low offset can be used.

In this embodiment, the tracking error signal is a signal completely equivalent to a sensor signal for controlling movement of the galvano mirror.

Generally, in the reproducing apparatus, when the optical head is moved to the position where the object lens deviates from the optical axis by, e.g., a track jump, etc., the component of the tracking deviation quantity with respect to the recording track and the offset component appearing as deviation of a return light by displacement of the object lens appears in an output of the bisected photo detector of a return light from the optical disc in such a manner that they are superimposed.

Figure 17:
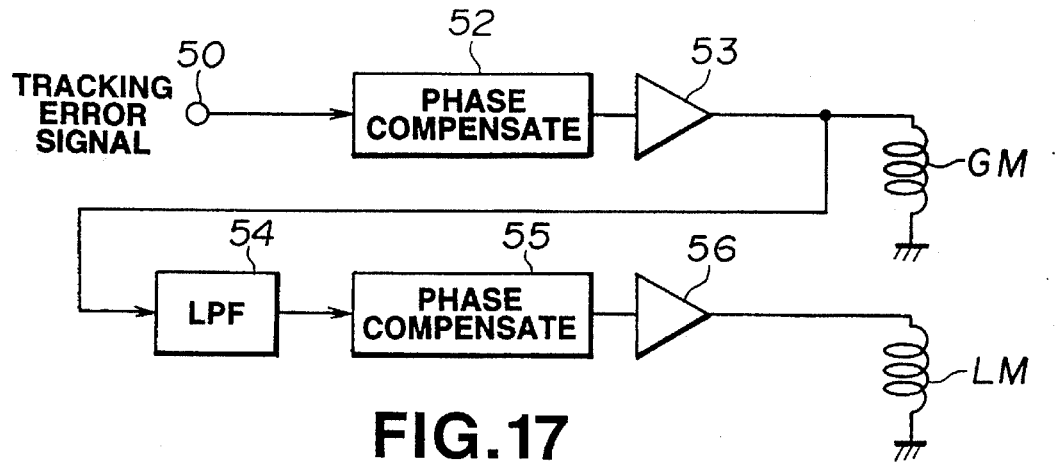
FIG. 17 is a circuit diagram showing, in a block form, the essential part for carrying out drive control of a galvano mirror drive motor and a linear motor of the reproducing apparatus using the optical recording medium according to this invention.

By a beam spot of an irradiated laser beam, the bisected photo detector outputs a signal based on a return light from the optical disc. As shown in FIG. 17, when an output signal from the d.c. offset cancel area B is sampled to integrate it at a predetermined time constant by low-pass filter 54, an integrated output of the low-pass filter 54 indicates a displacement quantity of the object lens. By this integrated output signal, a linear motor LM which is a rough movement actuator for carrying out a rough movement control in a vertical direction of the track moves the object lens in a direction to correct deviation of the optical axis thereof. By this drive control, a control is carried out so that displacement of the drive motor FM for the galvano mirror becomes equal to zero. In addition, with respect to the range except for the control range of the linear motor LM, tracking is carried out by the drive motor GM for the galvano mirror.

FIG. 17 is circuit constructed by putting emphasis on the operation of the above-described drive motor GM for galvano mirror. In this circuit, only a tracking error signal including no d.c. offset signal is used through input terminal 50 to carry out drive control of the galvano mirror drive motor GM and linear motor LM. In the circuit of FIG. 17, since drive control is carried out only by the tracking error signal, an output signal of an amplifier 53 is delivered to galvano mirror drive motor GM, and is also delivered to low-pass filter 54. A linear motor LM drive control signal passed trough the low-pass filter 54 is delivered to linear motor LM through a phase compensation circuit 55 and an amplifier 56.

By this circuit configuration, the galvano mirror drive motor GM is necessarily locked at the neutral point by the use of only the tracking error signal. On the other hand, the linear motor LM is driven and controlled by a signal which has been passed through phase compensation circuit 55 through low-pass filter 54. However, with this configuration, since low-pass filter 54 is used, it is difficult to extend the frequency band for such a drive control signal to the side of a higher frequency. Such influence increases swing of the galvano mirror drive motor GM, thus failing to obtain a predetermined accuracy.

Figure 18:
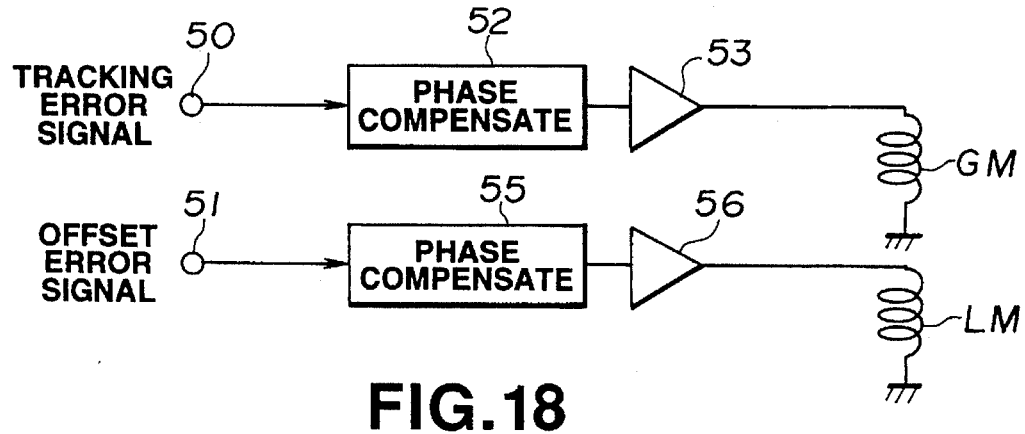
FIG. 18 is a circuit diagram showing, in a block form, the essential part for carrying out drive control of the galvano mirror drive motor and the linear motor of the reproducing apparatus using optical recording medium.

In view of this, a circuit configuration adapted to carry out drive control of the galvano mirror drive motor GM by using the offset canceled tracking error signal, and to carry out drive control of the linear motor LM by using an offset error signal is shown in FIG. 18. By a tracking error signal and an offset error signal delivered from input terminals 50, 51, galvano mirror drive motor GM and linear motor LM are respectively driven through phase compensation circuit 52 and amplifier 53, and phase compensation circuit 55 and amplifier 56.

In accordance with this circuit configuration, when the galvano mirror drive motor GM which is a fine movement actuator is moved to carry out track jump, etc., immediately after the object lens undergoes displacement, the linear motor LM which is the rough movement actuator is caused to follow movement of the object lens, i.e., the linear motor LM is moved so as to eliminate offset, thus making it possible to carry out high accuracy drive control. In this circuit, since no low-pass filter is used, it is possible to extend the frequency band for a tracking error signal delivered to the linear motor LM to the side of a higher frequency. Thus, high accuracy control of the linear motor LM can be carried out. It is to be noted that the above-mentioned frequency band is prescribed by a sampling rate for sampling the area B. If the same configuration is used also for drive control of the galvano mirror, there is the case where the drive control signal may be saturated. For this reason, there occurs the possibility that the galvano mirror GM may be looked at a point except for the neutral point.

Figure 19:
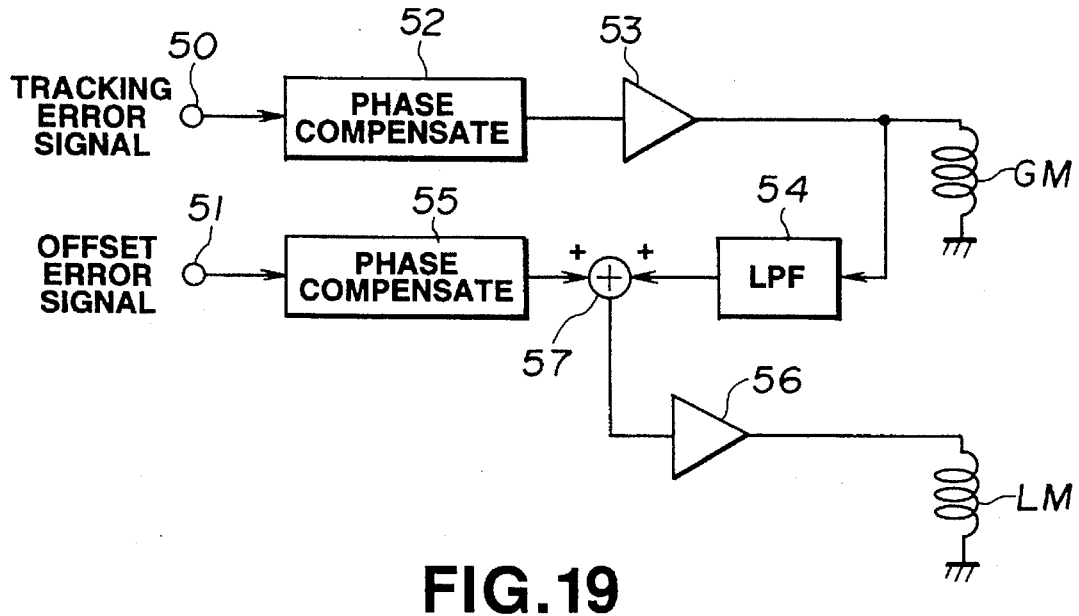
FIG. 19 is a circuit diagram showing, in a block form, the essential part when the circuit configurations shown in FIGS. 17 and 18 are combined in the reproducing apparatus using optical recording medium according to this invention.

As described above, it is seen that, in the reproducing apparatus, it is difficult to carry out drive control of both the galvano mirror GM and the linear motor LM with sufficiently high accuracy. In view of this, there is shown in a block form in FIG. 19 a circuit configuration of the essential part of a reproducing apparatus such that galvano mirror GM is caused to be necessarily locked at the neutral point and linear motor LM is driven with satisfactory accuracy, thereby making it possible to suppress swing width of galvano mirror GM. In this figure, the same reference numerals are respectively attached to common parts, and their explanation will be omitted.

The circuit for driving and controlling the galvano mirror drive motor GM and the linear motor LM is comprised of phase compensation circuits 52, 55, amplifiers 53, 56, low-pass filter 54, and an adder 57.

The circuit for driving the galvano mirror drive motor GM and the linear motor LM respectively deliver a tracking error signal and an offset error signal to phase compensation circuits 52, 55 through input terminals 50, 51. The tracking error signal is delivered to the galvano mirror drive motor GM through amplifier 53, and is delivered to one end side of adder 57 through low-pass filter 54. This adder 57 inputs offset error signal delivered from phase compensation circuit 55 to the other end side.

The adder 57 adds an output signal of the low-pass filter 54 and the phase-compensated offset error signal. Further, the adder 57 drives the linear motor LM through amplifier 56.

This circuit configuration controls displacement of the galvano mirror drive motor GM by the linear motor LM so that it becomes equal to zero as described, thus making it possible to recover the phase delay prescribed by the sampling rate. Accordingly, it is possible to extend the frequency band for drive control signal of the linear motor LM to the side of a higher frequency to control movement of linear motor LM with high accuracy. Further, an offset canceled less error tracking error signal is used in the control of the galvano mirror drive motor GM, thereby making it possible to suppress track deviation. Thus, even if slider or linear motor, etc. is driven like track jump, for example, it is possible to constitute a tracking servo system of high stability.

Figure 20:
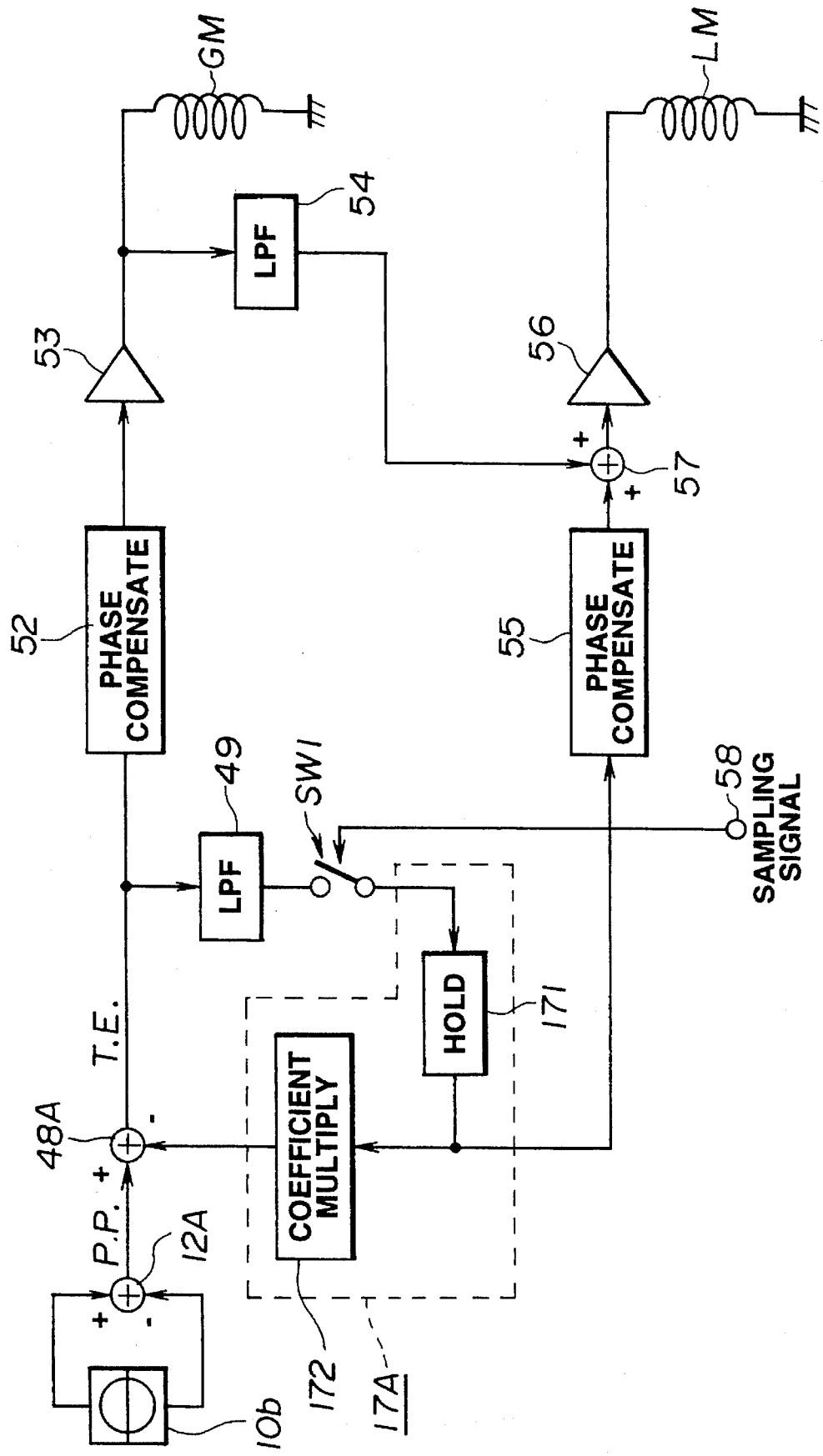
FIG. 20 is a circuit diagram showing, in a block form, the essential part for carrying out drive control of the galvano mirror drive motor and linear motor of the reproducing apparatus using optical recording medium according to this invention.

The configuration of the essential part in which the configuration of the above-described fundamental block circuit is applied to a portion of reproducing apparatus using optical recording medium will now be described with reference to the configuration of the block circuit of FIG. 20.

The circuit of the tracking servo system for carrying out d.c. offset canceling to control tracking of the beam spot is composed of bisected photo detector 10b, adders 12A, 48A, 57, phase compensation circuits 52, 55, low-pass filters 49, 54, amplifiers 53, 56, a hold coefficient multiplying unit 17A, galvano mirror drive motor GM, and linear motor LM.

The bisected photo detector 10b implements photoelectric conversion to a return light of the beam spot on the (+) side and on the (−) side of the detector to deliver electrical signals thus obtained to the adder 12A. The adder 12A takes a difference between the two signals to deliver a push-pull signal including a d.c. offset component to adder 48A for canceling d.c. offset component. This push-pull signal has a frequency band of substantially 100 kHz. It is to be noted that the above-mentioned adder 12A is a circuit element corresponding to d.c. offset canceling differential amplifier 12 in the previously described embodiment.

This adder 48A allows its output signal to be a tracking error signal including no d.c. offset component to deliver it to phase compensating circuit 52, and also delivers it to low-pass filter 49. This low-pass filter 49 is a filter in which the cut-off frequency $f_c$ is set to 10 kHz. The low-pass filter 49 provided in the offset canceling loop extracts a d.c. offset component included in a delivered signal to deliver it to changeover switch SW1. The changeover switch SW1 is supplied, from input terminal 58, with a sampling signal for carrying out switching control of the changeover switch. An offset error signal as a signal comprised of a sampled d.c. offset component is delivered to hold coefficient multiplying unit 17A for holding a signal delivered thereto when the changeover switch SW1 is turned ON.

The hold coefficient multiplying unit 17A includes, e.g., a hold section 171 and a coefficient multiplying section 172. The coefficient multiplying section 172 multiplies the offset error signal by, e.g., K to deliver it to the other side of adder 48A. The adder 48A subtracts the multiplied offset error signal from the push-pull signal including d.c. offset component to eliminate the d.c. offset component included in the push-pull signal. For this reason, an output signal from adder 48A results in tracking error signal including no d.c. offset component. The tracking error signal including no d.c. offset component is delivered to phase compensating circuit 52.

Further, the offset error signal is also delivered from hold coefficient multiplying unit 17A to phase compensating circuit 55. The phase compensating circuit 55 implements phase compensation to the offset error signal to deliver it to one end side of the adder 57. The other phase compensating circuit 52 delivers the tracking error signal including no d.c. offset component to the galvano mirror drive motor GM via amplifier 53, and delivers it to low-pass filter 54. By allowing the tracking error signal to be passed through the low-pass filter 54, the galvano mirror drive motor GM can be locked substantially at the neutral point.

This tracking error signal is delivered to the other side of the adder 57. The adder 57 delivers an output signal obtained by adding the offset error signal and the tracking error signal to the linear motor LM through amplifier 56. At this time, after the object lens undergoes displacement, the linear motor LM immediately makes a follow-up movement of the object lens so that no offset takes place by the component of a delivered offset error signal component. The follow-up movement control of the linear motor LM by this configuration can recover phase delay prescribed by the sampling rate of the offset cancel area B produced in the offset canceling loop, extend the signal frequency band of a signal delivered to the linear motor LM to the side of a higher frequency, and carry out movement control of the linear motor LM with high accuracy. For this reason, swing of the galvano mirror can become small. By driving the tracking servo system by such a configuration, it is possible to provide a servo system which can tolerate disturbance.

Further explanation will be given from a practical point of view. When, e.g., the magnitude of disturbance is assumed to be frequency of 1.5 GHz, movement quantities of the beam spot moving in accordance with respective servo loop frequency bands vary. The movement quantities every frequency bands thus set are as shown in Table 1.

value of 8.6 μm, the offset quantity in the galvano loop frequency band can fall within a predetermined range of 0.36 μm. Thus, it is possible to carry out drive control with this low frequency band servo signal.

By employing such a configuration, it is proven that even if the galvano mirror is swung by, e.g., a quantity corresponding to ±10 tracks, it is possible to substantially completely eliminate the offset component. Further, the operation of the galvano mirror which is the controlled unit of the reproducing apparatus can be carried out at the neutral point, and the frequency band of a servo signal used in the drive control can be held down to a low frequency band. Thus, it becomes unnecessary to use a broad band amplifier as an amplifier used in the reproducing apparatus thereby reducing the cost of the apparatus.

By employing the above-mentioned configuration, the recording/reproducing apparatus using optical recording medium can more improve the performance of the apparatus. Further, by taking into consideration the format of the optical disc, the circuit configuration for eliminating d.c. offset in the recording/reproducing apparatus using optical recording medium can be simplified. This can contribute to reduction of cost as well.

Further, the reproducing apparatus using optical recording medium feeds a signal comprised of d.c. offset component detected in the predetermined area of the optical recording medium back to a push-pull signal to carry out offset canceling, thereby making it possible to carry out precise elimination of a d.c. offset component without depending upon the condition such as presence or absence of a pair of guide grooves in the previously described optical recording medium. Thus, the performance of the apparatus can be improved.

Even if the fine movement actuator which is controlled unit is swung, when there is employed a method of applying offset error information to the rough movement actuator, or delivering a tracking error signal through low-pass filter thereto, combination of the linear motor and the galvano mirror in a low frequency band can be made, thus making it possible to prevent locking at the neutral point, and to avoid use of parts of broad band frequency. Thus, the cost can be further reduced.

Further, the predetermined area of the optical recording medium is caused to have address information, etc., thereby

TABLE 1

| LINEAR MOTOR LOOP FREQUENCY BAND (GALVANO SWING QUANTITY) | GALVANO LOOP FREQUENCY BAND (LEFT QUANTITY) (OFFSET QUANTITY) | OFFSET LOOP FREQUENCY BAND (OFFSET QUANTITY) |
|---|---|---|
| 200 Hz (8.6 μm) | 2 kHz (0.086 μm) (0.36μ) | 700 Hz (0.03 μm) |
| 500 Hz (1.4 μm) | 2 kHz (0.086 μm) (0.058 μm) | 700 Hz (0.03 μm) |
| 700 Hz (0.7 μm) | 2 kHz (0.086 μm) (0.03 μm) | 700 Hz (0.03 μm) |

As shown in the Table 1, even when the galvano loop frequency band and the offset loop frequency band corresponding to the sample servo frequency band do not vary in the state where they are respectively set to 2 kHz and 700 Hz, if the linear motor loop frequency band varies, movement quantity in the galvano loop frequency band becomes large. However, even if the galvano swing quantity in the linear motor loop frequency band of 200 Hz takes a large making it possible to increase the capacity of the optical recording medium without producing overhead on the format.

It is to be noted that while optical disc has been described as the optical recording medium in the above-described embodiment, recording media which can be used in this invention are not limited to the optical disc. Even if a recording medium, e.g., optical card, optical tape or optical drum, etc. is employed, such a recording medium is caused to be of the above-described structure of optical recording medium, thereby making it possible to eliminate d.c. offsets produced by the push-pull system.

What is claimed is:

1. A recording or reproducing apparatus using an optical recording medium, for carrying out recording/reproduction with respect to an optical recording medium having a groove formed at a track center position of a predetermined area of the optical recording medium, the optical recording medium also having recording tracks arranged between pairs of guide grooves, the apparatus comprising:

bisected photo detecting means for detecting a return light of a laser beam irradiated onto the optical recording medium by bisected light receiving sections;

difference signal output means for taking a difference between output signals from the bisected light receiving sections of the bisected photo detecting means to generate a difference signal;

first sample-hold means for sampling and holding a first difference signal obtained from a recording/reproducing area of the optical recording medium, the recording/reproducing area having recording tracks arranged between pairs of guide grooves;

second sample-hold means for sampling and holding a second difference signal obtained from a predetermined area of the optical recording medium where a groove is formed at a track center position of the optical recording medium;

means for switching transmission of the difference signal between the first and second sample and hold means; and adding means for adding outputs from the first and second sample-hold means for eliminating a d.c. offset component.

2. A recording or reproducing method for carrying out recording or reproduction with respect to an optical recording medium including a predetermined area having a groove formed at a track center position, the optical recording medium also including a recording/reproducing area having a recording track arranged between a pair of guide grooves, the method comprising the steps of:

detecting a return light of a laser beam irradiated onto the optical recording medium by bisected light receiving sections;

generating a difference between output signals from the respective light receiving sections to produce a difference signal;

sampling and holding the difference signal obtained from a recording/reproducing area of the optical recording medium at a first sample and hold means, the recording/reproducing area of the optical recording medium having a recording track arranged between a pair of guide grooves;

sampling and holding the difference signal obtained from a predetermined area of the optical recording medium having a groove formed at a track center position, the difference signal obtained from the predetermined area being sampled and held at a second sample and hold means;

switching transmission of the difference signal produced during the generating step between said first and second sample and hold means; and adding the sampled and held difference signals sampled and held by the first and second sample and hold means for eliminating a d.c. offset component included in the difference signal.

* * * * *